(12) United States Patent
Enders et al.

(10) Patent No.: US 7,396,040 B2
(45) Date of Patent: Jul. 8, 2008

(54) AIRBAG CUSHION WITH INTEGRATED INFLATOR

(75) Inventors: Mark L. Enders, Pleasant View, UT (US); Bradley W. Smith, Ogden, UT (US); Michael P. Jordan, South Weber, UT (US); Earl H. Nelson, Hooper, UT (US); Guy R. Letendre, Ogden, UT (US); Blake L. Cheal, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 409 days.

(21) Appl. No.: 11/087,017

(22) Filed: Mar. 22, 2005

(65) Prior Publication Data
US 2006/0214400 A1  Sep. 28, 2006

(51) Int. Cl.
    *B60R 21/16* (2006.01)
(52) U.S. Cl. .................................. 280/730.1
(58) Field of Classification Search ............... 280/730.1, 280/743.1
    See application file for complete search history.

(56) References Cited

U.S. PATENT DOCUMENTS

| 5,536,043 | A | * | 7/1996 | Lang et al. ................... 280/753 |
| 5,615,914 | A | | 4/1997 | Galbraith et al. |
| 5,752,717 | A | | 5/1998 | Galbraith et al. |
| 5,839,756 | A | | 11/1998 | Schenck et al. |
| 5,868,422 | A | | 2/1999 | Galbraith et al. |
| 6,213,497 | B1 | * | 4/2001 | Spencer et al. ............ 280/730.1 |
| 6,588,793 | B2 | * | 7/2003 | Rose ......................... 280/728.2 |
| 6,712,385 | B2 | | 3/2004 | Enders |
| 6,848,715 | B2 | | 2/2005 | Nelson et al. |
| 7,052,041 | B2 | | 5/2006 | McCormick ................. 280/741 |
| 2004/0007856 | A1 | | 1/2004 | Enders et al. |
| 2004/0080144 | A1 | | 4/2004 | Enders |
| 2004/0135353 | A1 | | 7/2004 | Enders et al. |
| 2004/0155447 | A1 | | 8/2004 | Smith et al. |
| 2005/0023802 | A1 | | 2/2005 | Enders et al. |
| 2007/0228699 | A1 | * | 10/2007 | Bederka et al. ........... 280/730.2 |

FOREIGN PATENT DOCUMENTS

| GB | 2 357 465 | 6/2001 |
| GB | 2 357 466 | 6/2001 |

* cited by examiner

*Primary Examiner*—Faye M. Fleming
(74) *Attorney, Agent, or Firm*—Sally J Brown; Madson & Austin

(57) ABSTRACT

An airbag module has a rigid cushion with an integrated inflator. The cushion has a rear cushion panel and the inflator may have a front inflator plate attached to the rear cushion panel. A rear inflator plate is optionally provided and may be positioned within the cushion or outside the cushion. A pyrotechnic may be disposed within the space between the front inflator plate and the rear cushion panel and/or the rear inflator plate. An initiator may be seated in the rear inflator plate and/or the rear cushion panel to initiate combustion of the pyrotechnic. Instead of the front inflator plate, the inflator may have an expanse of tape that secures the pyrotechnic and/or the initiator to the interior of the cushion. The pyrotechnic may be sealed by the tape or by a foil pouch. The initiator may be secured by the tape or by a rear inflator plate.

49 Claims, 12 Drawing Sheets

AIRBAG CUSHION WITH INTEGRATED INFLATOR

BACKGROUND OF THE INVENTION

1. Field of the Invention

The present invention relates to systems and methods for protecting vehicle occupants from injury. More specifically, the present invention relates to airbag cushions with integrated inflator hardware.

2. Description of Related Art

The inclusion of inflatable safety restraint devices, or airbags, is now a legal requirement for many new vehicles. Airbags are typically installed in the steering wheel and in the dashboard on the passenger side of a car. Additionally, airbags may be installed to inflate beside the passenger to provide side impact protection, in front of the knees or under the legs to protect the knees and/or maintain the posture of the occupant during impact, or at other strategic locations.

In the event of an accident, an accelerometer within the vehicle measures the abnormal deceleration and triggers the ignition of an explosive charge. Expanding gases from the charge fill the airbags, which immediately inflate to protect the driver and/or passengers from impact against the interior surfaces of the vehicle. During normal vehicle operation, airbags are typically stowed behind covers to protect them from tampering and to provide a more attractive interior facade for the vehicle.

Typically, the expanding gases are expelled into the cushion from an inflator that contains the gas in compressed form or generates gas through the ignition of a pyrotechnic. In certain airbag modules, the inflator is positioned within the cushion. Thus, the inflation gas is able to reach the cushion faster, and installation of the module may be simplified.

Unfortunately, the process of manufacturing, inserting, and attaching the inflator in place can add significantly to the cost of the airbag system. According to known methods, the inflator is often manufactured in a process entirely separate from that of the airbag cushion. Hence, two separate manufacturing processes must be used, and the products of both must be brought together to provide the complete module. The shipping, inventory, and general management costs associated with managing the separate production lines can be considerable.

Furthermore, installation of inflators for known airbag systems typically requires the use of nuts, bolts, clamps, retaining rings, and other pieces of installation hardware. Such hardware adds to the cost of the airbag system. Installation of the inflator may require considerable time from an operator, who may be required to use expensive, customized tooling to carry out the installation process.

When the inflator is to be installed in the cushion, the cushion may have to be sealed after installation of the inflator. Inflators installed outside a cushion may need to be connected to the cushion by gas guides or other expensive hardware designed to channel the inflation gas. The inflators used must often include baffles, screens, or other parts designed to cool the inflation gas and remove particulates to protect the cushion from damage.

Accordingly, a need exists for airbag modules and associated manufacturing and installation methods by which the inflator and cushion can be more easily combined for installation in a vehicle. Such modules and methods should preferably minimize the amount of time and hardware required for inflator/cushion integration. Additionally, such modules and methods should preferably be compatible with simplified, low-cost inflator designs. Furthermore, such modules and methods should preferably minimize the overall cost of the airbag module and the associated installation process.

SUMMARY OF THE INVENTION

The apparatus and method of the present invention have been developed in response to the present state of the art, and in particular, in response to the problems and needs in the art that have not yet been fully solved by currently available airbag modules, manufacturing methods, and installation methods. Thus, it is an overall objective of the present invention to provide an airbag module and associated manufacturing and installation methods that are capable of remedying the shortcomings of the prior art. Such modules and methods may simplify the manufacturing process and tooling, reduce inventories, facilitate the module installation process, and decrease the overall cost of the airbag system.

In accordance with the invention as embodied and broadly described herein in the preferred embodiment, an enhanced airbag module is provided. The airbag module may adapted to serve in a variety of protective capacities; for example, the airbag module may be used to protect the knees, protect the occupant from "submarining" (sliding under the primary airbag), or protect the occupant from side impact.

The airbag module may have a cushion constructed of a comparatively rigid material such as steel, aluminum, plastic, or a composite material. According to one embodiment, the airbag module may take the form of a folded rigid knee airbag. The folded rigid knee airbag may be mounted beneath the primary airbag in a lower portion of an instrument panel within the vehicle. The folded rigid knee airbag may inflate to protect the occupant's knees and to prevent the occupant's lower body from sliding underneath the primary airbag.

The cushion includes a rear cushion panel and a front cushion panel that are coupled together to define an expandable interior volume. According to one embodiment, the front cushion panel and the rear cushion panel are made of steel. The front cushion panel may be attached to a decorative trim panel that hides the airbag module and serves as a protective bolster to cushion the lower body portion of the occupant during a collision.

The front cushion panel may be attached to the rear cushion panel in any number of ways. For example, the peripheral region of the front cushion panel may be attached to the peripheral region of the rear cushion panel through the use of a plurality of spot welds distributed along the peripheral regions. In one embodiment, first and second lateral folds extend laterally along the rear cushion panel. First and second transverse folds may protrude from the rear side of the rear cushion panel in a transverse direction. Each of the lateral and transverse folds may permit the expansion of a portion of the rear cushion panel during deployment. Hence, the lateral and transverse folds unfold to form four substantially planar walls.

The front and rear cushion panels may each have a recess to provide space for an inflator within the expandable interior volume. According to one embodiment, the inflator has a front inflator plate and a rear inflator plate, each of which is constructed of a material similar to the materials used for the front and rear cushion panels. The inflator may also include an initiator retainer, an initiator, and a quantity of a gas pyrotechnic, such as a pyrotechnic. The rear inflator plate may have a shape similar to that of the recess of the rear cushion panel, so that the rear inflator plate follows the contour of the recess. The front inflator plate may have a plateau so that the_ front and rear inflator plates can be attached together to define an interior inflator volume within the expandable interior volume of the cushion.

The rear cushion panel and the rear inflator plate may each have an opening. The openings may be aligned to provide access into the inflator when the rear inflator plate has been installed in the recess of the rear cushion panel. The initiator retainer may have a generally annular shape, and may be installed within the openings of the rear cushion panel and the rear inflator plate.

The initiator may then be installed within the initiator retainer so that ignition prongs of the initiator retainer are accessible through the bore of the initiator retainer. A head of the initiator may then protrude into the interior inflator volume. The pyrotechnic may be disposed within the interior inflator volume, proximate the head of the initiator. The front inflator plate may have a series of orifices oriented radially to permit the escape of inflation gas from the inflator. The orifices may be covered by a frangible foil to prevent moisture contamination of the pyrotechnic prior to deployment.

According to one alternative embodiment, the rear inflator plate may be omitted entirely. The front inflator plate may simply be attached directly to the rear cushion panel. Thus, the rear cushion panel may act as the rear wall of the inflator. Such a configuration may simplify the assembly process.

The airbag module may be assembled in such a manner that the inflator is effectively integrated with the cushion. According to one manufacturing method, the front and rear cushion panels are first formed through a method such as stamping to provide the desired shapes. Similarly, the front and rear inflator plates are stamped into shape. The rear inflator plate is then attached to the recess of the rear cushion panel through a method such as spot welding. More specifically, a series of spot welds are distributed around a rim of the rear inflator plate, between the rear inflator plate and the rear cushion panel, to provide relatively easy and secure attachment. The initiator retainer is then inserted into the aligned orifices of the rear cushion panel and the rear inflator plate.

Once the initiator retainer is in place, the initiator is inserted into the bore of the initiator retainer, for example, by press fitting. The head of the initiator will then protrude inward (i.e., into what will become the expandable interior volume). The pyrotechnic is positioned around the head of the initiator. Then, the front inflator plate is positioned such that a rim of the front inflator plate contacts the rim of the rear inflator plate. The front and rear inflator plates are attached together through the use of a method such as spot welding; spot welds may simply be distributed about the rims of the front and rear inflator plates.

Once the front and rear inflator plates have been attached together, the inflator has been assembled, but the cushion has not been closed. Accordingly, the front and rear cushion panels are attached together. The outer edges of the front and rear cushion panels are first aligned and pressed together. The presence of the recesses of the front and rear cushion panels enables the outer edges to be pressed together despite the presence of the inflator between the front and rear cushion panels. Spot welds are then distributed about the outer edges to attach the front and rear cushion panels together.

When a collision occurs, the initiator receives an activation signal via the ignition prongs, which are accessible through the bore of the initiator retainer. The initiator ignites to trigger combustion of the pyrotechnic. The pyrotechnic then produces inflation gas, which bursts the foil covering the orifices of the front inflator plate and exits the inflator via the orifices. The inflation gas presses the front and rear cushion panels apart. The lateral and transverse folds expand to permit the front and rear cushion plates to move generally away from each other, so that longitudinal expansion of the cushion occurs.

According to one alternative embodiment, the lateral and transverse folds are omitted, and a peripheral portion with at least one accordion fold is used. The peripheral portion is disposed between the front and rear cushion panels, and is attached to the front and rear cushion panels via spot welding. The inflator is again integrated with the cushion, and may be attached to the rear cushion panel, either with or without a rear inflator plate. The cushion then deploys through expansion of the peripheral portion.

According to another alternative embodiment of the invention, an airbag module may include a cushion positioned underneath a vehicle seat for use as a pelvic restraint cushion, or "PRC." The cushion inflates to raise the forward portion of the bottom seat cushion, thereby restraining motion of the vehicle occupant's pelvis toward the instrument panel.

The cushion is configured in a manner similar to that of the first embodiment described above, with front and rear cushion panels formed of a rigid material such as steel. The airbag module also has an inflator integrated with the cushion; the inflator has a front inflator plate disposed within the expandable interior volume defined by the cushion, and a rear inflator plate disposed outside the expandable interior volume.

The front and rear inflator plates are attached together by fasteners, each of which has a shank that extends through an aligned set of holes in the front and rear inflator plates and optionally, in the rear cushion panel. The rear cushion panel is sandwiched between the front and rear inflator plates, and has an opening that spans most of the space between the front and rear inflator plates. Each of the front and rear inflator plates has a rim with a flange that extends generally perpendicular to the cushion to provide bending resistance.

The inflator includes a pyrotechnic sealed within a pouch between the front and rear inflator plates. The pouch is formed of a metal foil, and is seated in a first plateau of the front inflator plate. A filter is seated in a second plateau of the front inflator plate. An initiator is seated in the rear inflator plate, for example, through the use of an initiator retainer as described previously.

The first plateau has a plurality of orifices through which gas created by combustion of the pyrotechnic may leave the inflator to enter the remainder of the expandable interior volume. A screen is positioned between the pyrotechnic and the orifices to capture particulate matter. Each of the front and rear inflator plates has a venting orifice. The venting orifices are positioned on either side of the filter so that gas is able to vent from the cushion by moving through the filter, which helps to ensure that solid matter is not ejected from the cushion.

The airbag module may be manufactured by aligning the front inflator plate with the rear cushion panel and then inserting the shanks of the fasteners through the aligned holes. The front cushion panel may then be attached to the rear cushion panel, for example, by welding. The screen, pyrotechnic, and filter may then be inserted into the corresponding plateaus of the front inflator plate. The initiator may be seated in the initiator retainer, and the initiator retainer may be seated in an opening formed in the rear inflator plate. The rear inflator plate may then be installed by inserting the shanks through aligned holes formed in the rim of the rear inflator plate. The shanks of the fasteners may then be used to attach the assembled airbag module to a vehicle.

According to another alternative embodiment of the invention, an airbag module may have a cushion similar or identical to that of the previous embodiment. An inflator is integrated with the cushion, but is configured differently from that described above. The inflator includes front and rear inflator plates. The front inflator plate is not configured as described above, but instead takes the form of a bracket, or an open frame with a plurality of integrally formed fasteners. The fasteners may take the form of studs that protrude through the bag.

The rear cushion panel has an opening through which an initiator is installed. In alternative embodiments, the rear inflator plate may be omitted in favor of installation of the initiator directly in the opening. However, in this embodiment, the rear inflator plate is present and includes an opening in which an initiator retainer is installed to retain an initiator, as in the previous embodiment. The rear inflator plate may be used as a mounting plate to attach the airbag module to the vehicle. Accordingly, the rear inflator plate may extend to either side of its opening, and may have one or more mounting features, such as holes, that facilitate attachment of the rear inflator plate to an interior structural feature of the vehicle.

The pyrotechnic need not be disposed between the front and rear inflator plates, but is instead attached to the front cushion panel via an expanse of tape. The tape may be formed of a metal, such as aluminum, coated on one side with an adhesive. The pyrotechnic is again sealed in a pouch formed of a metal foil. The initiator initiates combustion of the pyrotechnic through the tape. The pyrotechnic may be of a type that burns rapidly, even in the absence of high ambient pressure.

The airbag module may be manufactured by inserting the shanks of the fasteners integrally formed with the front inflator plate (or bracket) through aligned holes of the rear cushion panel. The front cushion panel is attached to the rear cushion panel, and the pyrotechnic is attached to the inside of the front cushion panel through the opening of the rear cushion panel. The initiator is installed in the initiator retainer, and the initiator retainer is seated in the opening of the rear inflator plate. In alternative embodiments, the initiator may be installed directly in the opening of the rear cushion panel prior to assembly of the front and rear cushion panels.

The rear inflator plate is then installed by inserting the shanks of the fasteners through the aligned holes of the rim of the rear inflator plate to complete the assembly. The airbag module may then be installed in a vehicle.

According to another alternative embodiment of the invention, an airbag module has a cushion similar to that of the two previous embodiments, except that the rear cushion panel has a small opening in place of the larger opening of the previous embodiments. An inflator of the airbag module is integrated with the cushion, but does not include a rear inflator plate. The inflator includes a front inflator plate in the form of an open frame or bracket with integrated fasteners, like that described above.

The inflator also includes an expanse of tape including first and second pieces of tape that are positioned in layers to attach a pyrotechnic to the rear cushion. The pyrotechnic is sealed in a pouch formed of a metal foil. An initiator is also retained by the tape, and is positioned adjacent to the pouch. No initiator retainer need be provided. The initiator is coupled to the sensor mechanism within the vehicle via wires that terminate at a connector coupled to the initiator.

The expanse of tape, initiator, and pyrotechnic are placed generally in the open space of the front inflator plate. A screen is attached to the adhesive side of the second piece of tape, between the tape and the pyrotechnic. The first piece of tape has a burst region adjacent to the portion of the second piece of tape to which the screen is attached. The screen may be constructed of a fabric material, a perforated material, an expandable metal mesh, or the like. The burst region is open so that, in order for inflation gas to escape the compartment defined by the tape, the gases may simply move through the screen and rupture the second piece of tape. The burst region defines the shape of the resulting rupture in the second piece.

The front inflator plate may have an inwardly extending ledge that presses the edges of the first and second pieces of tape against the rear cushion panel to help the tape to remain attached under the pressure generated by combustion of the pyrotechnic. In alternative embodiments, the inwardly extending ledge may be omitted in favor of positioning the edges of the first and second pieces of tape under the main body of the front inflator plate. The edges of the screen may optionally also be pressed under the inwardly extending ledge, or under the main body of the front inflator plate, and the screen may optionally be positioned between the first and second pieces of tape. If gas flow toward the periphery of the cushion is desirable, the second piece of tape may be a placed to block only the center of the screen, thereby favoring gas flow through the sides of the screen.

The airbag module may be manufactured by, first, placing the pyrotechnic and the initiator on the rear cushion panel. The initiator may be connected to wires passing through the rear cushion panel via the relatively small opening formed in the rear cushion panel. The pieces of tape may be attached together to form the expanse of tape, and the screen may be attached to the central portion of the expanse of tape. The expanse of tape may then be placed over the pyrotechnic and the initiator and attached to the rear cushion panel to fix the pyrotechnic and the initiator in place. The front inflator plate may be attached to the rear cushion panel such that the inwardly extending ledge overlaps and retains the edges of the first and second pieces of tape, and the shanks of the fasteners pass through the aligned holes formed in the rear cushion panel. The front cushion panel may then be attached to the rear cushion panel to complete the assembly.

According to yet another alternative embodiment of the invention, an airbag module may have a cushion similar to that of the previous embodiment, and an inflator integrated with the cushion. The inflator includes a front inflator plate in the form of a frame with integrally formed fasteners, as described above. The inflator also includes an expanse of tape that is used to attach a pyrotechnic and an initiator to the rear cushion panel in a manner different from that of the previous embodiment.

More precisely, the expanse of tape may be double-sided tape having first and second adhesive sides. The expanse of tape is folded over itself in a generally S-shaped pattern to form two compartments, at least one of which is sealed from the remainder of the expandable interior volume of the cushion. The pyrotechnic is disposed in the sealed compartment, and does not require a pouch because the compartment provides the necessary hermetic seal. The initiator is disposed in the other compartment formed by the expanse of tape. Wires extend from a connector coupled to the initiator, out of the compartment and out of the cushion through an opening formed in the rear cushion panel.

The airbag module may be manufactured by, first assembling the front inflator plate and the rear cushion panel as in the previous embodiment. The expanse of tape may be folded around the pyrotechnic and the initiator in the configuration described above to form a first compartment containing the pyrotechnic and a second compartment containing the initiator. The expanse of tape may then be placed on the side surface of the rear cushion panel, within the open portion of the front inflator plate. The wires connected to the initiator may be inserted through the opening of the rear cushion panel, and the front and rear cushion panels may be attached together to complete the assembly.

According to another alternative embodiment of the invention, an airbag module may have a cushion similar to that of the previous embodiment, and an inflator integrated with, but disposed generally outside the cushion. The cushion includes front and rear cushion panels. The rear cushion panel has a depression in which a frangible portion is positioned. The frangible portion has intersecting scores along which the frangible portion is able to tear open to permit inflation gas from the adjacent pyrotechnic to flow into the cushion.

The inflator includes front and rear inflator plates. The front inflator plate may be within the cushion, and the rear inflator plate may be attached to the front inflator plate in such a manner that a screen and a pyrotechnic are generally sandwiched between the rear cushion panel and the rear inflator plate. The pyrotechnic and the screen extend into the depression and are seated against the frangible portion. An initiator is seated in the rear inflator plate, adjacent to the pyrotechnic. The inflator is sealed from moisture entry via o-rings. Ignition of the initiator causes the pyrotechnic to ignite, thereby producing inflation gas that passes through the screen and ruptures the frangible portion to inflate the cushion.

The airbag module may be manufactured by, first, installing the initiator in the rear inflator plate. The rear inflator plate and initiator may then be stacked together with the pyrotechnic and the screen, and the resulting assembly may be placed against the rear cushion panel. The front inflator plate may be positioned against the rear cushion panel, and a plurality of fasteners may be inserted through openings in the front and rear cushion plates, the screen, and the rear cushion panel to attach the various parts of the inflator together and to the rear cushion panel. The front and rear cushion panels may then be attached together to complete the assembly.

Through the use of the airbag modules and associated manufacturing methods of the present invention, cushions and inflators are integrated with each other to enable the production and installation of airbag modules in a more convenient and cost-effective manner. Furthermore, such airbag modules provide enhanced reliability by virtue of the simplicity of the design and the manufacturing process.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 12, is not intended to limit the scope of the invention, as claimed, but is merely representative of presently preferred embodiments of the invention.

The present invention utilizes integration to enhance the cost-effectiveness and operation of airbag modules. More specifically, integration of the inflator with the cushion is utilized to provide an airbag module with a simplified, low-cost design. The cushion and inflator can be manufactured in a unified process, thereby avoiding the necessity of installing the inflator into or around the finished cushion. Additionally, lower material costs can be achieved because the integration permits the elimination of redundant structure.

Such principles may be applied to many types of airbags, including driver's side airbags, passenger's side airbags, overhead airbags, knee bolsters, pelvic restraint cushions, inflatable curtains, and other airbag types. The manner in which the present invention utilizes these principles to provide cost-effective, reliable impact protection will be shown and described in greater detail with reference to FIGS. 1 through 12.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured integrally, i.e., as a single piece, without requiring the assembly of multiple pieces. Multiple parts may be integrally formed with each other if they are formed from a single workpiece.

Figure 1:
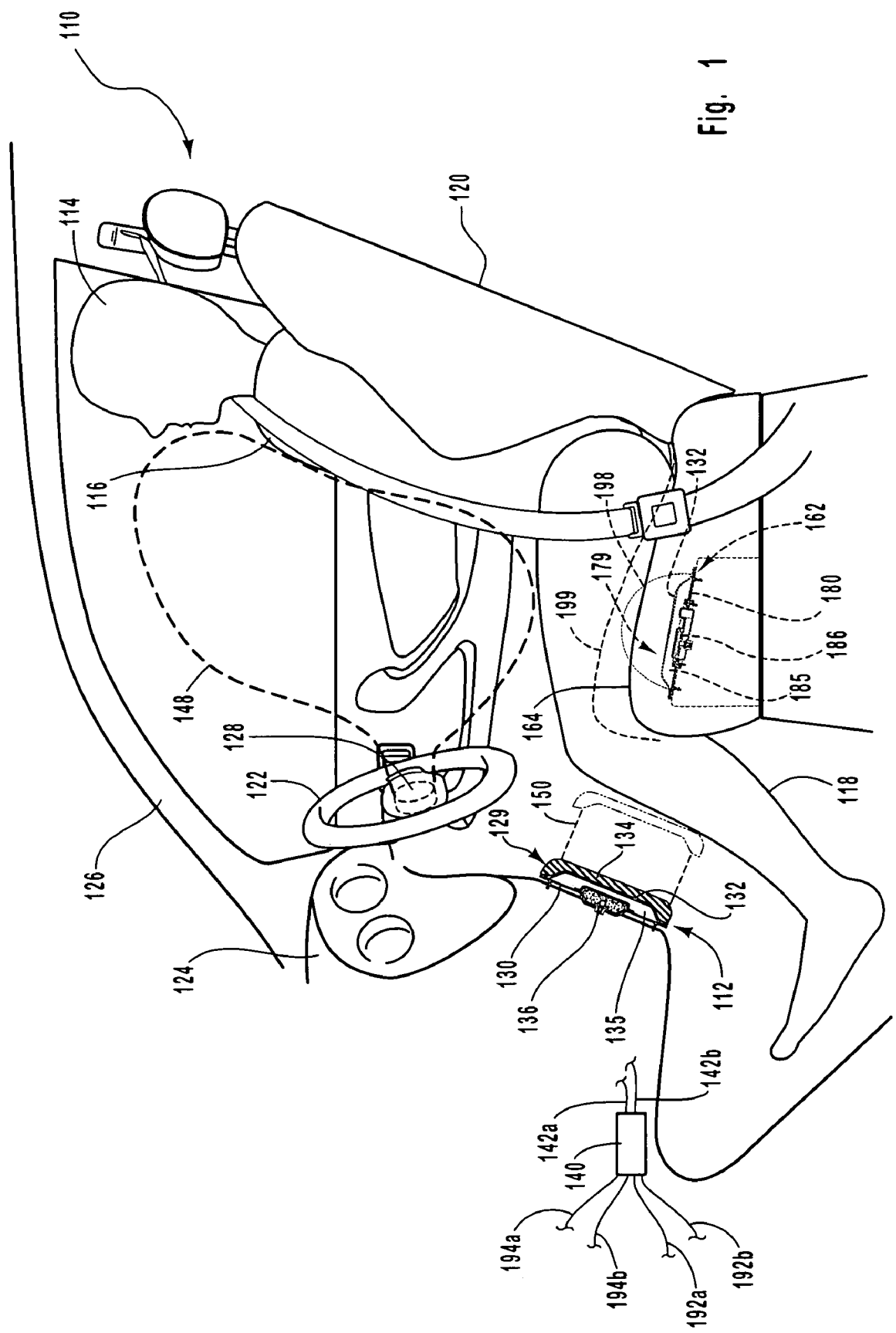
FIG. 1 is a side elevation, section view of a vehicle incorporating one embodiment of a knee airbag module and one embodiment of a pelvic restraint airbag module, each of which has an integrated cushion and inflator according to the invention.

Referring to FIG. 1, a side elevation, section view depicts an interior portion of a vehicle 110 having a folded rigid knee airbag module 112 installed. The folded rigid knee airbag module 112, or airbag module 112, of FIG. 1 is simply one application for integrated cushion/inflator structures; the principles of the present invention are equally applicable to other types of airbags such as side impact airbags, front impact airbags, and differently located anti-submarining airbags. According to one alternative embodiment, the airbag module 112 may be positioned underneath a seat to provide anti-submarining protection.

In FIG. 1, a vehicle occupant 114 having an upper body portion 116 and a lower body portion 118 is shown seated in a front seat 120. The front seat 120 faces a steering wheel 122, an instrument panel 124, and a windshield 126. A primary airbag 128 is contained within the steering wheel 122. The folded rigid knee airbag module 112 is mounted in a lower portion of the instrument panel 124 within the vehicle 110.

The folded rigid knee airbag module 112 has a cushion 129, which may be formed of a comparatively rigid material such as a metal, composite, or plastic. The cushion 129 may include a rear cushion panel 130 and a front cushion panel 132 which is attached to a decorative trim panel 134. The decorative trim panel 134 serves as a bolster for contacting the lower body portion 118 of the occupant 114 during a collision involving the vehicle 110. The trim panel 134 also allows the airbag module 112 to be visually integrated into the interior of the vehicle 110. As used herein, the term "front" refers to features positioned or oriented toward the vehicle occupant, and the term "rear" refers to features positioned or oriented further from the vehicle occupant.

The rear cushion panel 130 and the front cushion panel 132 are coupled together to define an expandable interior volume 135, which is comparatively small when the airbag module 112 is in the folded state. The expandable interior volume 135 is bounded by an interior surface, which consists of the combined inward-facing surfaces of the rear and front cushion panels 130, 132. The expandable interior volume 135 contains an inflator 136 that produces a quantity of pressurized inflation gas upon receipt of an activation signal. In this application, the term "inflator" is broadly interpreted to include both rigid, independently enclosed structures, and structures that are not enclosed, are not rigid, or are integrated with other structures to provide an enclosure.

The vehicle 110 also includes a sensor mechanism 140, which is configured to sense an impact to the vehicle 110. A pair of lead wires 142a-b are attached to the sensor mechanism 140. The lead wires 142a-b provide electrical communication between the sensor mechanism 140 and the inflator 136. The airbag module 112 may be attached to the instrument panel 124 through the use of a variety of mechanisms, including nut/bolt combinations, clips, snaps, locking tabs, welds, adhesive or chemical bonds, and the like.

Upon detection of a collision, the sensor mechanism 140 transmits an electrical signal to the inflator 136, as well as a corresponding inflator (not shown) of the primary airbag 128. The inflator 136 and the inflator of the primary airbag 128 each rapidly discharge pressurized inflation gas to induce inflation of the primary airbag 128 and the folded rigid knee airbag module 112 into their respective inflated positions 148 and 150. In its inflated position 148, the primary airbag 128 prevents the upper body portion 116 of the occupant 114 from striking the windshield 126, the instrument panel 124, or the steering wheel 122.

Since the entire body of the occupant 114 must decelerate, there is a tendency for the lower body 118 of the occupant 114 to slide forward, under the primary airbag 128. This lower body motion is referred to as "submarining," and may reduce the protective capacity of the primary airbag 128, especially when the occupant 114 is not properly restrained by a seat belt. In its inflated position 150, the folded rigid knee airbag module 112 prevents submarining, i.e., prevents the lower body portion 118 of the vehicle occupant 114 from sliding forward.

As shown, an airbag module 162 is also installed in the vehicle 110 to help prevent submarining. The airbag module 162 is installed underneath a bottom cushion 164 of the front seat 120 of the vehicle 110. The airbag module 162 includes a cushion 179 that may be termed a "pelvic restraint cushion," or "PRC." The cushion 179 includes a front cushion panel 132 like that of the airbag module 112 described previously. The front cushion panel 132 is attached to a rear cushion panel 180 to form the cushion 179, thereby defining an expandable interior volume 185 that can be filled with pressurized gas to inflate the cushion 179.

Use of the terms "front" and "rear" in the context of a pelvic restraint cushion is with reference to the vehicle occupant 114, not to the vehicle 110. Thus, the front cushion panel 132 is the panel of the cushion 179 that is closest to the occupant 114, and the rear cushion panel 180 is the panel furthest from the occupant 114.

The airbag module 162 also includes an inflator 186 that is integrated with the cushion 179. The inflator 186 produces inflation gas in response to receipt of an electric activation signal, which may be generated and/or initiated by the sensor mechanism 140 and transmitted to the inflator 186 via lead wires 192a, 192b. Lead wires 194a, 194b are also connected to the sensor mechanism 140 and to a lateral pelvic airbag, which will be shown and described in connection with FIG. 2.

The inflation gas inflates the cushion 179, which then obtains an inflated position 198, as indicated in phantom. During inflation, the cushion 179 presses upward against the bottom cushion 164 so that the bottom cushion 164 assumes the position 199, also illustrated in phantom. The bottom cushion 164 then raises the knees of the occupant 114 and serves as a barrier to forward motion of the pelvis of the occupant 114.

Accordingly, the airbag module 162 also provides protection against occupant submarining during impact. The airbag module 162 may be used in place of the airbag module 112, or in addition to the airbag module 112 as illustrated in FIG. 1. The airbag module 112 will be shown and described in greater detail in connection with FIGS. 3-6, and the airbag module 162 will be shown and described in greater detail in connection with FIG. 8.

Figure 2:
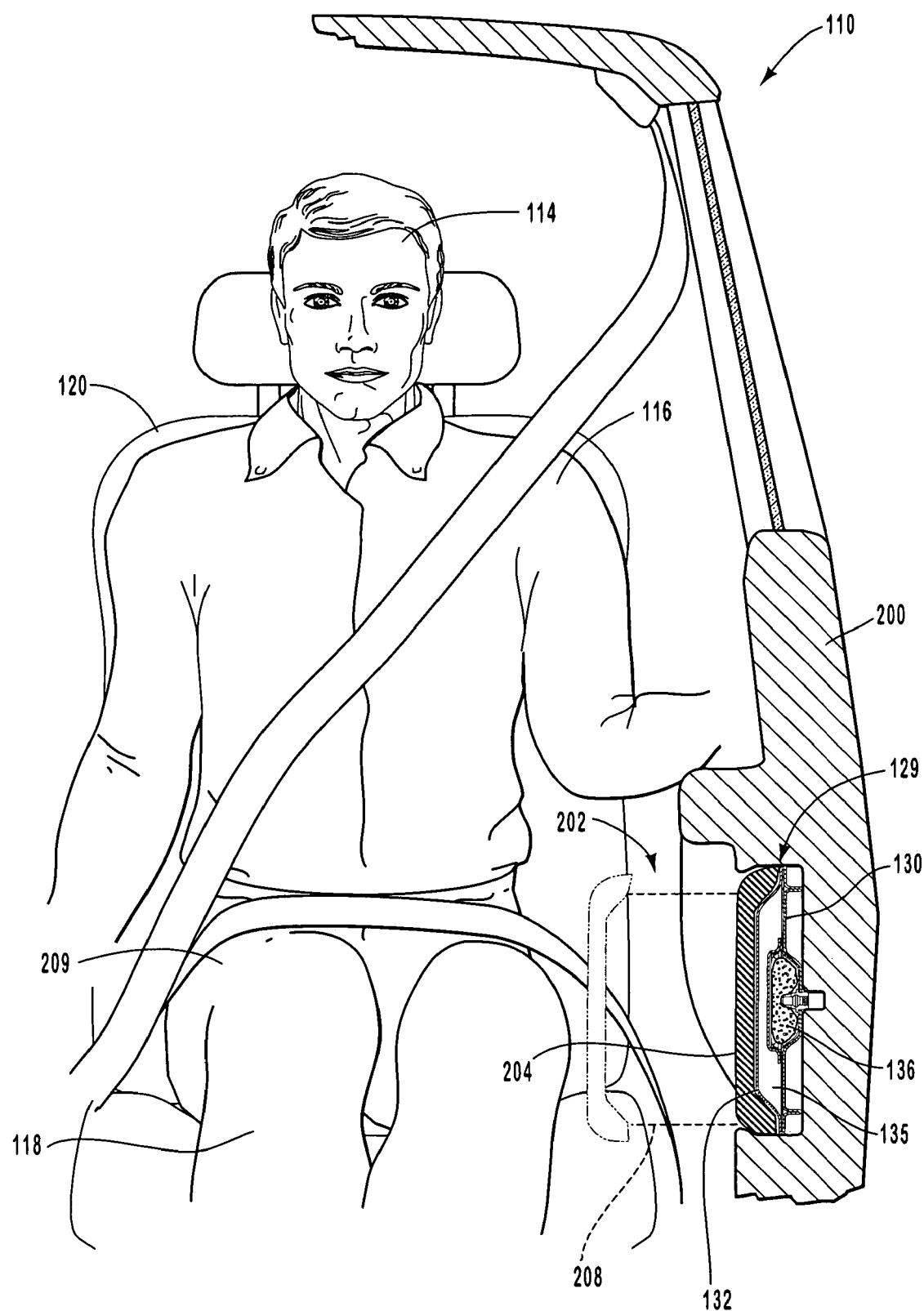
FIG. 2 is a front elevation, section view of the vehicle of FIG. 1, illustrating one embodiment of a lateral pelvic airbag module with an integrated cushion and inflator according to the invention.

Referring to FIG. 2, a front elevation, section view illustrates the driver's side of the vehicle 110 of FIG. 1. As shown, the vehicle 110 has a door 200 positioned outboard of the occupant 114. A lateral pelvic airbag module 202 is mounted in the door 200 to protect the occupant 114 from lateral impact. In the embodiment illustrated in FIG. 2, the lateral pelvic airbag module 202, or module 202, includes a cushion 129 and an inflator 136 like the cushion 129 and the inflator 136 of the folded rigid knee airbag module 112 of FIG. 1. As in the module 112, the cushion 129 has a rear cushion panel 130 and a front cushion panel 132 that cooperate to define an expandable interior volume 135. A decorative trim panel 204 is attached to the front cushion panel 132 to hide the cushion 129.

In response to detection of a lateral impact or rollover by the sensor mechanism 140, an activation signal is transmitted to the inflator 136 of the module 202 via the lead wires 194a and 194b (shown in FIG. 1). The inflator 136 provides inflation gas to inflate the cushion 129, which expands to a position 208 illustrated in phantom in FIG. 2. The position 208 is alongside a pelvis 209 of the occupant 114. Thus, the pelvis 209 is cushioned to protect the pelvis 209 from injury due to impact against the door 200.

Figure 3:
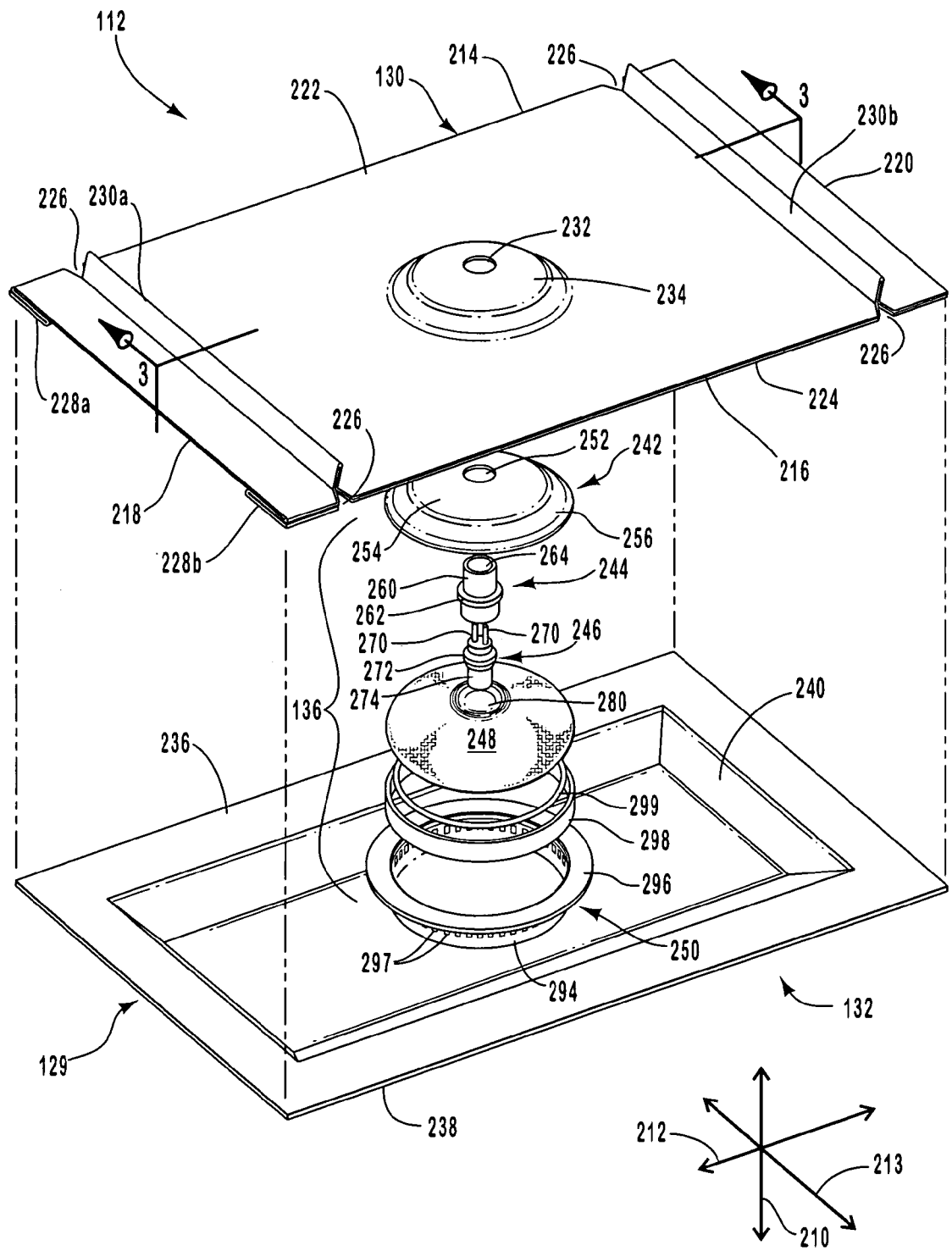
FIG. 3 is an exploded, perspective view of the knee airbag module of FIG. 1.

Referring to FIG. 3, an exploded perspective view shows the folded rigid knee airbag module 112. The folded rigid knee airbag module 112 has a longitudinal direction 210, a lateral direction 212, and a transverse direction 213. As stated previously, the folded rigid knee airbag module 112 includes a rear cushion panel 130 and a front cushion panel 132 that are coupled together to enclose the inflator 136. In FIG. 3, the decorative trim panel 134 has been omitted for clarity, and will be omitted in the remaining figures.

The front and rear cushion panels 132, 130 may be constructed of a comparatively stiff, rigid material such as metal, plastic, or a composite. For this application, "substantially rigid materials" are materials that can maintain a persistent shape. Hence, metals, plastics, and composites are generally rigid materials when formed in continuous, non-woven expanses, while fabrics and the like are not, even though they may include plastics or the like. According to one embodiment, the panels 130, 132 are constructed of steel, and have a thickness ranging from about 0.010 inches to about 0.020 inches. Each of the panels 130, 132 may, for example, be about 0.015 or 0.018 inches thick.

In alternative embodiments, different thicknesses and/or materials may be used. Alternative materials include different metals such as aluminum, engineering plastics, and composite materials. Multiple different materials may also be used in the construction of a single cushion.

As illustrated, the rear cushion panel 130 has a first transverse edge 214, a second transverse edge 216, a first lateral edge 218, and a second lateral edge 220. The rear cushion panel 130 also has a rear side 222 and a front side 224 opposite the rear side 222. Four notches 226 are positioned around the perimeter of the rear cushion panel 130. In particular, two of the notches 226 are positioned on either side of the first transverse edge 214. The other two notches 226 are positioned on either side of the second transverse edge 216, as shown.

First and second lateral folds 228a, 228b extend from the first lateral edge 218 to the second lateral edge 220 in the lateral direction 212. A first transverse fold 230a protrudes longitudinally out of the rear side 222 and extends in the transverse direction 213 between two oppositely positioned notches 226 of the first and second transverse edges 214, 216. Similarly, a second transverse fold 230b protrudes longitudinally out of the rear side 222 and extends in the transverse direction 213 between the other pair of oppositely positioned notches 226 of the first and second transverse edges 214, 216. The configuration of the lateral folds 228a, 228b and the transverse folds 230a, 230b will be explained in greater detail below in connection with FIG. 6.

The first transverse fold 230a intersects the first lateral fold 228a near the first transverse edge 214 and the first lateral edge 218. The first transverse fold 230a intersects the second lateral fold 228b near the second transverse edge 216 and the first lateral edge 218. The second transverse fold 230b intersects the first lateral fold 228a near the first transverse edge 214 and the second lateral edge 220. The second transverse fold 230b intersects the second lateral fold 228b near the second transverse edge 216 and the first lateral edge 218.

An opening 232 is positioned approximately halfway between the first transverse edge 214 and the second transverse edge 216, and approximately halfway between the first lateral edge 218 and the second lateral edge 220. The opening 232 provides access to the interior of the cushion 129, so that the activation signal can be delivered to the inflator 136. The opening 232 may be located in a recess 234 of the rear cushion panel 130; the recess 234 may be shaped to receive the inflator 136 in a manner that will be described in greater detail subsequently.

The front cushion panel 132 has a rear side 236 and a front side 238 opposite the rear side 236. The front cushion panel 132 also has a recess 240, which extends in the longitudinal direction 210 to increase the size of the expandable interior volume 135 when the cushion 129 is in the folded state in order to accommodate the inflator 136.

The inflator 136 may be of any suitable type or construction for supplying a medium for inflating the cushion 129. For example, the inflator 136 may be a pyrotechnic, compressed gas, or hybrid inflator. As shown in FIG. 3, the inflator 136 is a pyrotechnic inflator that uses the combustion of gas-generating material (pyrotechnic) to generate inflation gas to inflate the cushion 129. The inflator 136 may be designed to facilitate integration of the inflator 136 with the cushion 129.

In the configuration of FIG. 3, the inflator 136 may include a rear inflator plate 242, an initiator retainer 244, an initiator 246, a quantity of pyrotechnic 248, and a front inflator plate 250. The front and rear inflator plates 250, 242 may be designed to enclose the pyrotechnic 248, and at least a portion of the initiator 246 and the initiator retainer 244. In this application, the term "plate" broadly refers to a variety of structural members. The front and rear inflator plates 250, 242 cooperate to form an enclosed shape in the embodiment of FIG. 3; however, in alternative embodiments, an inflator plate may be open in favor of open inflator construction or to cooperate with a different structure that provides enclosure.

If desired, the inflator plates 250, 242 may be constructed of a material similar to that of the cushion panels 130, 132. For example, the inflator plates 242, 250 may also be constructed of steel with approximately the same thickness as that of the cushion plates 130, 132. Alternatively, different thicknesses or different materials may be used, depending on the required relative pressure bearing capacity and the manufacturing process used. For example, the inflator plates 242, 250 may each be about 0.040 inches to about 0.50 inches thick to provide additional structural strength.

The rear inflator plate 242 may have an opening 252 similar in size and shape to the opening 232. The rear inflator plate 242 may also have a recess 254 with a contour that generally matches that of the recess 234 of the rear cushion plate 130.

The opening 252 may be positioned such that, when the rear inflator plate 242 is seated against the rear cushion plate 130 with the recesses 234, 254 abutting, the opening 252 is aligned with the opening 232. The rear inflator plate 242 may also have a rim 256 that extends outward from the recess 254 to facilitate attachment to the front inflator plate 250 and the rear cushion panel 130.

The initiator retainer 244 may have a body 260 with a generally tubular shape sized to permit passage of the body 260 into the openings 232, 252. One or more features, such as a detent ridge 262, may be included to limit motion of the body 260 through the openings 232, 252. The initiator retainer 244 may have a bore 264 sized to receive the initiator 246.

The initiator 246 may have a pair of ignition prongs 270 that receive the activation signal from the sensor mechanism 140. The ignition prongs 270 may be accessible through the bore 264, and may be coupled to an electrical plug (not shown) that is, in turn, coupled to the lead wires 142a, 142b. The initiator 246 may also have an enlarged portion 272 that can be seated within the bore 164, and a head 274 extending toward the pyrotechnic 248.

The pyrotechnic 248 may be left loose, or may be disposed within a flexible cover to facilitate installation. If such a cover is used, the cover may be shaped to enable the pyrotechnic 248 to generally encircle the head 274 of the initiator 246. Thus, the cover may have an indentation 280 shaped to receive the head 274.

The front inflator plate 250 may have a plateau 294 that extends toward the front cushion panel 132. Additionally, the front inflator plate 250 may have a rim 296 that extends outward from the plateau 294 to facilitate attachment with the rear inflator plate 242. The plateau 294 may have a plurality of orifices 297 distributed about the generally tubular wall of the plateau 294. The orifices 297 may be oriented radially so that inflation gas leaving the inflator 136 is distributed relatively evenly throughout the expandable interior volume 135.

Beneficially, the configuration of the cushion 129 enables the use of comparatively simple inflator hardware. More specifically, many inflators require the inclusion of filters, screens, baffles, and other structures designed to cool or clean the inflation gas. Such structures are necessitated by the fabric materials used for many airbags, which can be damaged by hot gas, particularly when hot particulate matter is ejected toward the fabric. No such danger exists for steel. Indeed, steel is an excellent thermal conductor. Hence, the inflation gas need not be cleansed or cooled prior exiting the inflator 136. Thus, the inflator 136 may have a very simple and inexpensive structure, and a comparatively inexpensive pyrotechnic 248 may be used.

A sealing member in the form of a ring of foil 298 may be included, and may be positioned directly inward of the orifices 297 to restrict leakage of moisture or other contaminants into the inflator 136. In this application, a "sealing member" is any member that can be used, either alone or in combination with other structures, to provide a hermetic seal to protect a pyrotechnic from moisture.

If desired, a gasket 299 may also be included within the inflator 136. The gasket 299 may be formed of rubber, silicon, or the like, and may be shaped to form a ring slightly smaller than the interior diameter of the rims 256, 296 of the rear and front inflator plates 242, 250. The gasket 299 may be disposed generally between and inward of the rims 256, 296 to further restrict leakage of contaminants into the inflator 136.

Figure 4:
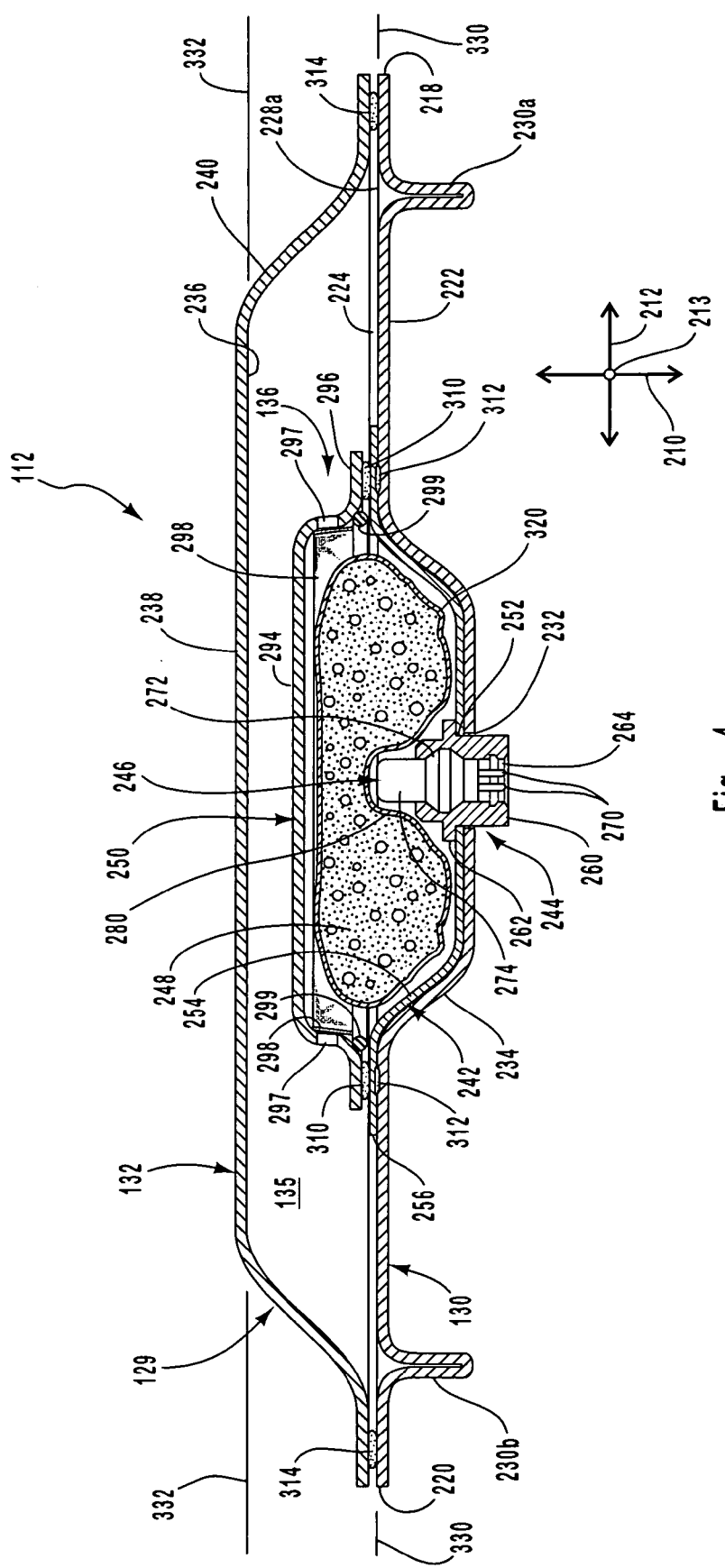
FIG. 4 is a side elevation, section view of the airbag module of FIG. 1, in the fully assembled and undeployed state.

Referring to FIG. 4, a section view depicts the airbag module 112 in the fully assembled state. As shown, the rear inflator plate 242 is disposed to abut the recess 240 of the rear cushion panel 130. The rear inflator plate 242 has been affixed to the rear cushion panel 130 through the use of an attachment mechanism that can be rapidly and easily applied.

In the configuration of FIG. 4, the attachment mechanism takes the form of a plurality of spot welds 310 distributed about the rim 256, between the rim 256 and the rear cushion panel 130. Beneficially, such an attachment mechanism is contained entirely within the cushion 129. Hence, the rear cushion panel 130 need not be manipulated from the rear side 222 to attach the rear inflator plate 242. Spot welds may be rapidly applied without adding rigid mechanical fasteners such as nuts and bolts. Attachment hardware is minimized because only the welds themselves need be added to the airbag module 112.

Application of other fastenerless attachment mechanisms, such as line welds, radio frequency welds, ultrasonic welds, frictional welds, laser welds, inertial welds, brazed interfaces, adhesive bonds, and chemical bonds may have similar benefits. Of course, fasteners and the like could also be used, if desired. The type of attachment mechanism used may depend upon the materials used for the cushion 129 and the inflator 136; for example, adhesive bonding may be more appropriate for embodiments in which the cushion panels 130, 132 are constructed of plastic materials.

As shown, the initiator retainer 244 has also been positioned within the openings 232, 252 of the rear inflator plate 242 and the rear cushion panel 130, and the initiator 246 is disposed within the bore 264 of the initiator retainer 244. The front inflator plate 250 has been positioned against the rear inflator plate 242 to define the interior inflator volume that contains the pyrotechnic 248. The front and rear inflator plates 250, 242 have been attached together through the use of spot welds 312 distributed about the rim 256, between the rim 256 of the rear inflator plate 242 and the rim 296 of the front inflator plate 250.

The rear and front cushion panels 130, 132 have also been attached together to define the expandable interior volume 135 and enclose the inflator 136. Spot welds 314 have been distributed about the edges of the rear and front cushion panels 130, 132 to attach the cushion panels 130, 132 together.

A wide variety of manufacturing process steps and sequences may be utilized to obtain the configuration shown in FIG. 4. According to one exemplary process, the inflator 136 is fully assembled and mounted prior to attachment of the front and rear cushion panels 130, 132 to each other. More specifically, the rear inflator plate 242 may first be attached to the rear cushion panel 130 via application of the spot welds 310. The initiator retainer 244 may then be inserted into the openings 232, 252. The initiator retainer 244 may simply be interference fit into position, or may be fixed in place through the use of adhesives, welds, or the like. The initiator 246 may then be interference fitted into place within the bore 264 of the initiator retainer 244, with the head 274 inward and the ignition prongs 270 outward.

Once the initiator 246 has been installed, the pyrotechnic 248 may be positioned adjacent to the rear inflator plate 242, in such a manner that the pyrotechnic 248 generally surrounds the head 274. As mentioned previously, a cover 320 may be used to facilitate positioning of the pyrotechnic 248; the cover 320 may be constructed of a frangible fabric material or the like. As shown, the head 274 is positioned within the indentation 280 of the cover 320.

After the pyrotechnic 248 has been positioned, the foil 298 may be attached to the interior of the front inflator plate 250 to cover the orifices 297. The foil 298 may, for example, be bonded, welded, or brazed into place. The gasket 299 may also be positioned adjacent to and inward of the rim 256 of the rear inflator plate 242. Once the foil 298 and the gasket 299 are in position, the front inflator plate 250 may be attached to the rear inflator plate 250 to form the complete inflator 136. As mentioned previously, attachment of the inflator plates 242, 250 may be performed via the spot welds 312. Alternatively, as with the spot welds 310, many alternative forms of attachment may be used.

The spot welds 310 are applied at intervals, and therefore may not provide a gas-tight seal between the rear and front inflator plates 242, 250. Although the inflator 136 may be generally sealed by the gasket 299 and the foil 298 to prevent contamination, an absolute gas-tight seal need not be provided. Rather, the inflator 136 may be designed in such a manner that its operation is not dependent upon the existence of high pressure within the inflator 136. For example, the pyrotechnic 248 may be a type that does not require a high pressure environment to facilitate combustion. UIX is one example of a pyrotechnic that may be used.

Once the inflator 136 has been assembled, the front cushion panel 132 may be attached to the rear cushion panel 130 to complete assembly of the cushion 129. As mentioned previously, the cushion panels 130, 132 may be attached through the use of spot welds 314. As above, other attachment methods may be used in the alternative, as desired.

As shown, the rear inflator plate 130 defines a rear plane 330, and the front inflator plate 132 defines a front inflator plane 332. In this application, a plane is defined by the largest (i.e., largest surface area) inward facing planar surface of a structure. Accordingly, the front plane 332 is coplanar with the rear side 236 of the planar portion of the recess 240 of the front cushion panel 132, since the planar portion of the recess 240 has a surface area larger than that of any other planar portion of the rear side 236. Similarly, the rear plane 330 is coplanar with the portion of the front side 224 of the rear cushion panel 130 that excludes the recess 234, since that portion has a larger planar surface area than that of the planar portion of the recess 234.

As shown, a portion of the pyrotechnic 248 is positioned between the front and rear planes 332, 330. Consequently, inflation is more rapid because at least some of the inflation gas provided by the pyrotechnic 248 will be generated between the front and rear planes 332, 330, and thus need not enter the expandable interior volume 135 from outside the space between the front and rear planes 332, 330.

The rear and front cushion panels 130, 132 also need not be attached together in gas-tight fashion. The spot welds 314 must simply attach the cushion panels 130, 132 tightly enough to create a substantial restriction to airflow out of the cushion 129, so that pressure is able to build within the cushion 129 during deployment to induce expansion of the cushion 129.

The rigidity of the material of the cushion 129 may be sufficient to cushion impact against the cushion 129; hence, the protective capability of the airbag module 112 is not necessarily dependent upon the maintenance of positive pressure within the cushion 129 during impact. Hence, so long as the pressure differential within the cushion 129 is sufficient to induce expansion of the cushion 129, gas leakage from the cushion 129 prior to impact of the occupant 114 against the cushion 129 may not impair its operation. The thickness of the material of the cushion 129 may be selected to ensure that the deployed cushion 129 is sufficiently rigid, and yet sufficiently pliable, to provide impact protection.

If desired, gaskets or other sealing devices (not shown) may be used to enhance the integrity of the seal between the cushion panels 130, 132. If the cushion panels 130, 132 are sealed in a substantially gastight fashion, the impact of the occupant 114 against the cushion 129 may be absorbed by positive internal pressure rather than by the rigidity of the material of the cushion 129. Hence, if the cushion panels 130, 132 are sealed together, the material of the cushion 129 may possibly be somewhat thinner, and hence less rigid, because positive pressure will be present within the cushion 129 at the time the occupant 114 strikes the cushion 129.

Figure 5:
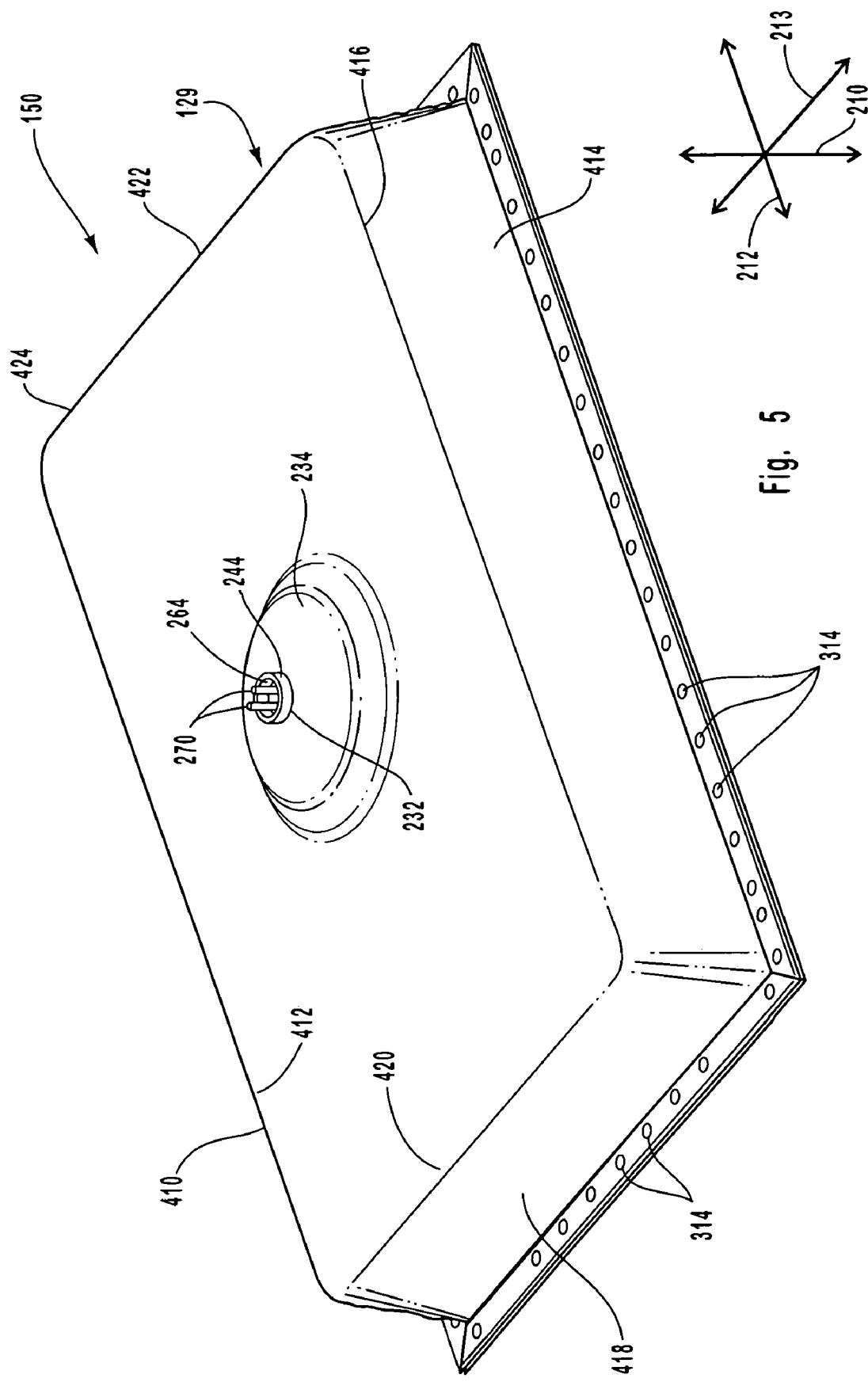
FIG. 5 is a perspective view of the airbag module of FIG. 1, in the inflated state.

Referring to FIG. 5, perspective view shows the inflated position 150 of the airbag module 112 of FIGS. 1, 3, and 4. The first lateral fold 228a has unfolded to form a first substantially planar wall 410 having a first rear edge 412, and the second lateral fold 228b has unfolded to form a second substantially planar wall 414 opposite the first substantially planar wall 410 and having a second rear edge 416. Similarly, the first transverse fold 230a has unfolded to form a third substantially planar wall 418 having a third rear edge 420, and the second transverse fold 230b unfolds to form a fourth substantially planar wall 422 opposite the third substantially planar wall 418 and having a fourth rear edge 424. The area of the rear cushion panel 130 enclosed by the rear edges 412, 416, 420, and 424 is substantially parallel to the front cushion panel 132.

Advantageously, the lateral folds 228a, 228b and the transverse folds 230a, 230b allow the front cushion panel 132 to remain substantially flat during inflation. This permits the airbag module 112 to inflate evenly, thereby reducing the likelihood that the trim panel 134 will interact with the vehicle occupant 114 at an angle during an accident. In addition, the cross-sectional area of the airbag module 112 in its inflated configuration is about the same as the cross-sectional area of the airbag module 112 in its compact configuration. This allows the airbag module 112 to be more easily integrated into the interior of the vehicle 110.

If desired, the front cushion panel 132 may be thicker than the rear cushion panel 130. Such a thickness difference may preserve the expandability of the rear cushion panel 130 while enhancing the ability of the front cushion panel 132 to remain substantially flat during inflation.

Figure 6:
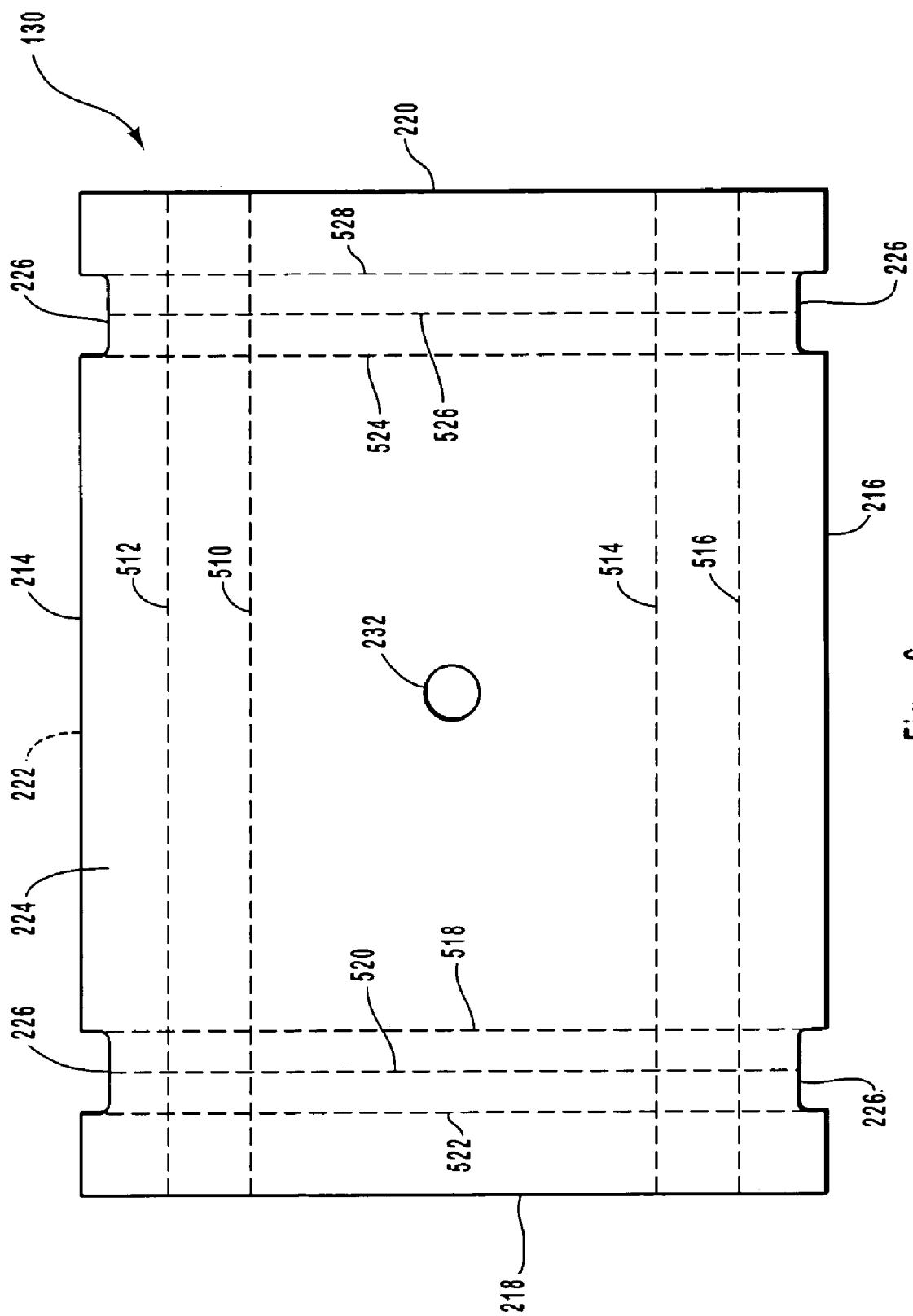
FIG. 6 is a plan view of the rear cushion plate of the airbag module of FIG. 1, shown prior to folding of the rear cushion plate, with dashed lines to indicate the manner in which the rear cushion panel may be folded.

Referring to FIG. 6 a plan view depicts the rear cushion panel 130 in its pre-folded state. The rear cushion panel may first be stamped or otherwise formed of sheet metal. The lateral folds 228a, 228b and the transverse folds 230a, 230b may be created in a variety of ways, one of which will be explained below.

To create the first lateral fold 228a, the first transverse edge 214 may first be bent at a 180° angle toward the front side 224 along the fold line 510. The first transverse edge 214 is then bent at a 180° angle toward the rear side 222 along the fold line 512. To create the second lateral fold 228b, the second transverse edge 216 may first be bent at a 180° angle toward the front side 224 along the fold line 514. The second transverse edge 216 is then bent at a 180° angle toward the rear side 222 along the fold line 516.

To create the first transverse fold 230a, the first lateral edge 218 is first bent at a 90° angle toward the rear side 222 along the fold line 518. The first lateral edge 218 is then bent at a 180° angle toward the front side 224 along the fold line 520. Finally, the first lateral edge 218 is bent at a 90° angle toward the rear side 222 along the fold line 522.

To create the second transverse fold 230b, the second lateral edge 220 is first bent at a 90° angle toward the rear side 222 along the fold line 524. The second lateral edge 220 is then bent at a 180° angle toward the front side 224 along the fold line 526. Finally, the second lateral edge 220 is bent at a 90° angle toward the rear side 222 along the fold line 528.

After the folding steps described above have been performed, the rear cushion panel 130 obtains the folded configuration shown in FIG. 3. Such a folded configuration beneficially provides relatively simple construction and uniform unfolding of the cushion 129. Of course, other fold configurations may be used within the scope of the present invention.

Figure 7:
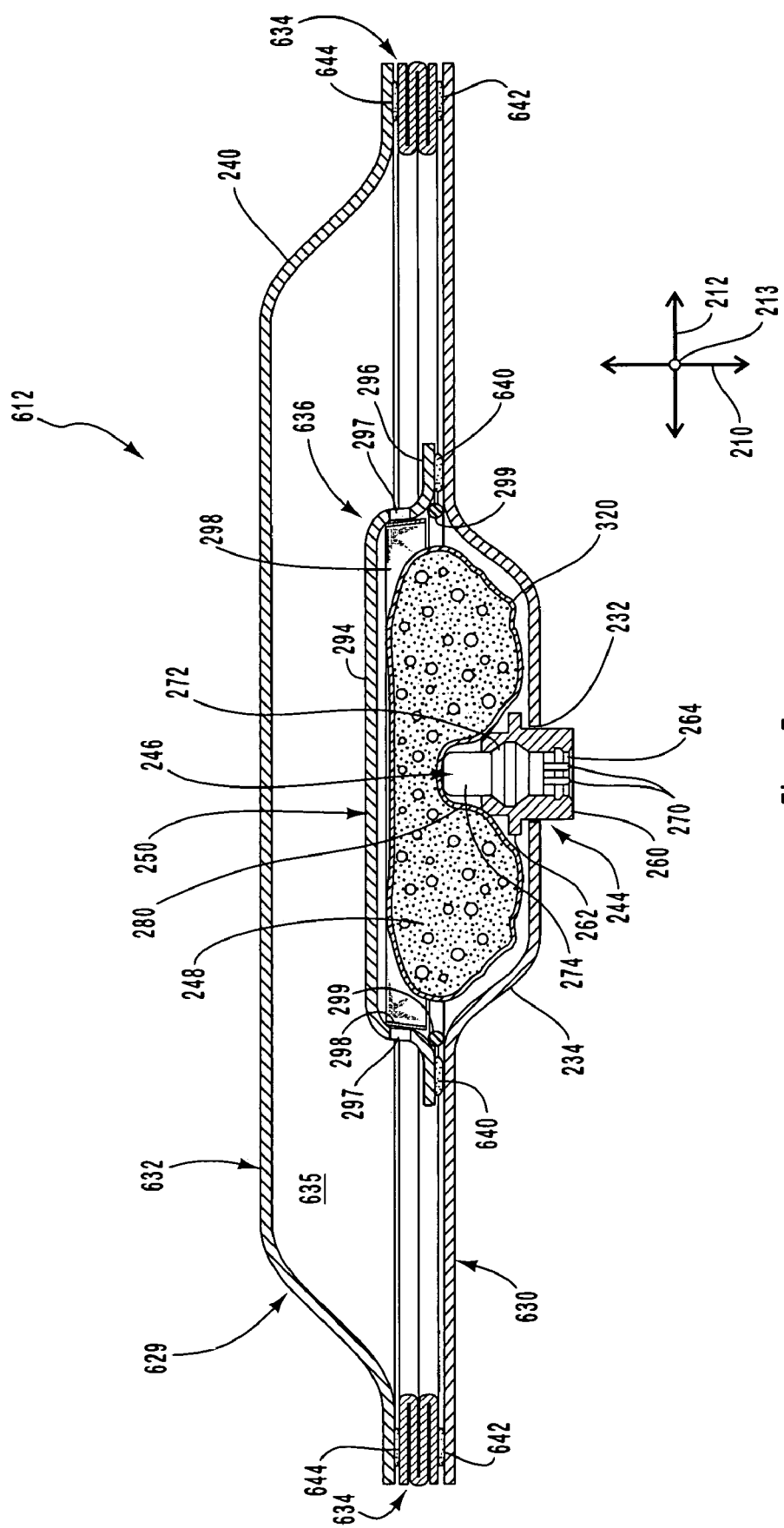
FIG. 7 is a side elevation, section view of a knee airbag module according to an alternative embodiment of the invention, with the folds of the rear cushion plate replaced by a separate peripheral portion that joints the front and rear cushion plates, and without a rear inflator plate.

Referring to FIG. 7, a section view depicts one alternative embodiment of a folded rigid knee airbag module 112 according to the invention. The airbag module 112 has a cushion 629 that includes a rear cushion panel 630 and a front cushion panel 632. The rear cushion panel 630 has an overall shape similar to that of the rear cushion panel 130 of the previous embodiment. Like the rear cushion panel 130, the rear cushion panel 630 has a recess 234. However, the rear cushion panel 630 is not designed to unfold; hence, the lateral folds 228a, 228b and the transverse folds 230a, 230b have been omitted from the rear cushion panel 630. The front cushion panel 632 has a shape similar to that of the front cushion panel 132 of the previous embodiment.

In place of the folds 228a, 228b, 230a, 230b, the cushion 629 of FIG. 7 includes a peripheral portion 634 designed to expand so that the cushion panels 630, 632 are able to move away from each other. The peripheral portion 634 may extend around the periphery of the cushion panels 630, 632 and may be attached to the cushion panels 630, 632. The peripheral portion 634 may be accordion folded one or more times in a manner similar to that of the lateral folds 228a, 228b, so that the peripheral portion 634 is able to expand in the longitudinal direction 210.

The front cushion panel 632, the rear cushion panel 630, and the peripheral portion 634 cooperate to define an expandable interior volume 635, which is bounded by an interior surface of the cushion 629. The interior surface consists of the combined inward-facing surfaces of the front cushion panel 632, the rear cushion panel 630, and the peripheral portion 634. As with the previous embodiment, an inflator 636 is positioned within the expandable interior volume 635.

The inflator 636 may have configuration somewhat similar to that of the inflator 136 of the previous embodiment. The inflator 136 has an initiator retainer 244, an initiator 246, a quantity of pyrotechnic 248, and a front inflator plate 250. However, the rear inflator plate 242 has been omitted from the inflator 636. The front inflator plate 250 has been attached directly to the rear cushion panel 630, instead of being attached to the rear cushion panel 630 by virtue of attachment of the front inflator plate 250 directly to the rear inflator plate 242 and attachment of the rear inflator plate 242 directly to the rear cushion panel 630. Hence, the rear cushion panel 630 serves not only as a boundary for the cushion 629, but also as a boundary for the inflator 636.

Consequently, the configuration of FIG. 7 provides an even higher degree of integration between the inflator 636 and the cushion 629. Such further integration may be feasible if the rear cushion panel 630 is thick enough to withstand the pressure of combustion within the inflator 636 when the airbag module 612 deploys. If desired, the material of the recess 234 of the rear cushion panel 630 may be made somewhat thicker than that of the remainder of the rear cushion panel 630 to compensate for the comparatively higher pressures within the inflator 636.

Assembly of the airbag module 612 may be performed in a manner somewhat similar to that of the airbag module 112. However, the steps of forming attaching the rear inflator plate 242 need not be performed. Rather, the initiator retainer 244 may be inserted into the opening 232 of the rear cushion panel 630, alone. The initiator 246 may be seated within the bore 264 of the initiator retainer 244 and the pyrotechnic 248 may be positioned proximate the head 274 of the initiator 246.

Once the pyrotechnic 248 is in position, the front inflator plate 250 may be attached directly to the rear cushion panel 630. As with the previous embodiment, the front inflator plate 250 may be attached to the rear cushion panel 630 in a variety of ways. Advantageously, an attachment mechanism disposed entirely within the cushion 629 may be used, for the reasons mentioned in connection with the previous embodiment. FIG. 7 shows the use of a plurality of spot welds 640 distributed around the rim 296 of the front inflator plate 250 to attach the front inflator plate 250 to the rear cushion panel 630.

The peripheral portion 634 may also be attached to the rear and front cushion panels 630, 632 through the use of spot welds 642 and spot welds 644, respectively. The spot welds 642 may be distributed about the periphery of the rear cushion panel 630, while the spot welds 642 are distributed about the periphery of the front cushion panel 632. As with the previous embodiment, the spot welds 640, 642 may be applied after the inflator 636 has been fully assembled against the rear cushion panel 630.

Figure 8:
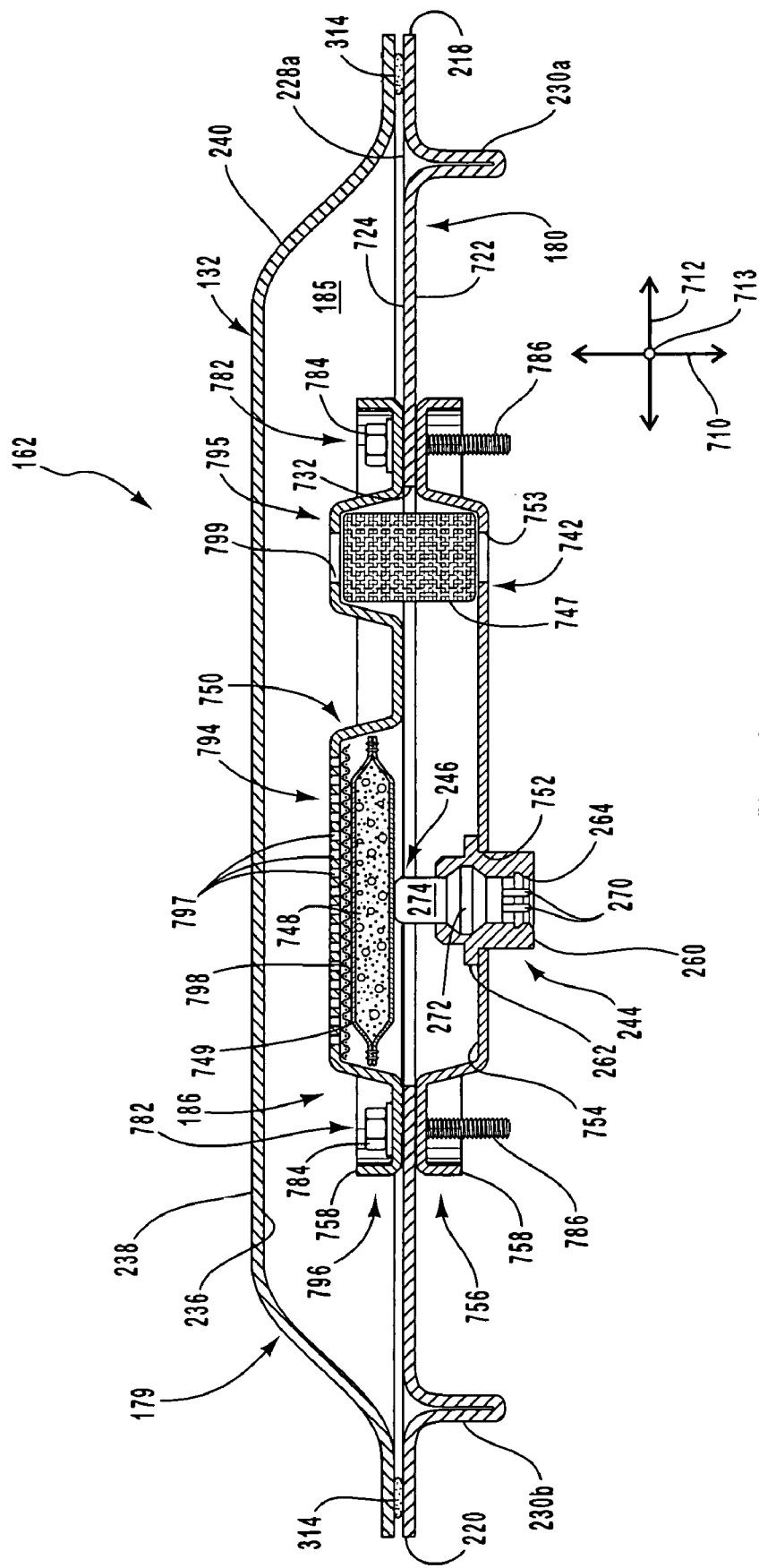
FIG. 8 is a side elevation, section view of the pelvic restraint airbag module of FIG. 1.

Referring to FIG. 8, a side elevation, section view illustrates the airbag module 162 in greater detail. As shown, the airbag module 162 has a longitudinal direction 710, a lateral direction 712, and a transverse direction 713, as indicated by the arrows in FIG. 8. As mentioned in connection with FIG. 1, the cushion 179 of the airbag module 162 includes a front cushion panel 132 like that of the cushion 129, and a rear cushion panel 180 configured similarly, but not identically, to the rear cushion panel 130 of the cushion 129.

Like the rear cushion panel 130, the rear cushion panel 180 has first and second lateral edges 218, 220, lateral folds 228a, 228b (not visible in FIG. 8), and transverse folds 230a, 230b. The rear cushion panel 180 also has a rear side 722 that faces outside the cushion 179 and a front side 724 that faces inward with respect to the cushion 179. In this application, an "inward facing surface" is a surface that faces toward a geometric center of the expandable interior volume of a cushion. An "interior surface" is a surface that forms a boundary of or is disposed within the expandable interior volume of a cushion.

The rear cushion panel 180 has an opening 732 with a comparatively large size. The front cushion panel 132 is like that of the first embodiment, and therefore has a rear side 236 that faces inside the cushion 179, a front side 238 that faces outside the cushion 179, and a recess 240.

The inflator 186 includes a rear inflator plate 742, an initiator retainer 244, an initiator 246, a filter 747, a pyrotechnic 748, a pouch 749, and a front inflator plate 750. The pyrotechnic 748 may be of a type designed to burn rapidly at relatively low pressures. According to one example, the pyrotechnic 748 comprises UIX. The pyrotechnic 748 may be present in the form of a solid block or a block of pressed material, or as a loose powder. A loose powder may be more difficult to handle during manufacturing, but may combust more rapidly due to the comparatively larger exposed surface area.

The pouch 749 serves as a sealing member by forming a hermetic seal around the pyrotechnic 748 to protect the pyrotechnic 748 from moisture, and may be formed of a material such as a metal foil. The pouch 749 may be formed of aluminum, and may be bonded, crimped, or otherwise sealed around the pyrotechnic 748. The filter 747 filters inflation gases prior to venting of the gases from the cushion 179 to avoid ejection of solid matter out of the cushion 179.

The rear and front inflator plates 742, 750 serve to contain the pyrotechnic 849, the pouch 749, and the filter 747. The initiator 246 is seated in the initiator retainer 244, which is installed in an opening 752 formed in the rear inflator plate 742. The initiator retainer 244 and the initiator 246 may be similar to or identical to those described in connection with the first embodiment. In the alternative to the arrangement illustrated in FIG. 8, the initiator 246 may be contained entirely within the expandable interior volume 185, and may be seated in a side wall or other portion of the front inflator plate 750. In the embodiment of FIG. 8, the rear and front inflator plates 742, 750 may be formed of a metal such as steel. In alternative embodiments, inflator plates (not shown) may be formed of plastic materials, ceramics, composite materials, and the like.

The filter 747 is positioned adjacent to a venting orifice 753 formed in the rear inflator plate 742. The rear inflator plate 742 has a recess extending away from the cushion 179; the opening 752 and the venting orifice 753 are formed in the recess 754.

The rear inflator plate 742 also has a rim 756 in which a plurality (for example, four) holes (not visible) are formed. The rim has a flange 758 that extends around substantially the entire periphery of the rear inflator plate 742. The flange 758 extends generally perpendicular to the cushion 179 (i.e., in the longitudinal direction 710) to provide resistance to bending of the rear inflator plate 742 in the longitudinal direction 710. As the pyrotechnic 748 combusts, considerable pressure may be generated, and the flange 758 helps the rear inflator plate 742 to maintain its shape, thereby providing consistent structural support to the cushion 179 during inflation.

As in previous embodiments, the initiator retainer 244 has a body 260 with a detent ridge 262 designed to ensure that the initiator retainer 244 remains seated in the opening 752 of the rear inflator plate 742. The initiator retainer 244 also has a bore 264 in which the initiator 246 is installed, as described in connection with previous embodiments. The initiator 246 has a pair of ignition prongs 270 designed to receive the electric activation signal. The initiator 246 also has an enlarged portion 272 retained by the bore 264 and a head 274 that ignites in response to receipt of the electric activation signal.

The airbag module 162 also includes a plurality (for example, four) fasteners 782 that are used to attach the rear and front inflator plates 742, 750 together and to attach the rear and front inflator plates 742, 750 to the rear cushion panel 180. Each of the fasteners 782 includes a head 784 and a shank 786 with a threaded shape. The fasteners 782 may be PIM fasteners. Consequently, each of the heads 784 may have a splined shape (not shown) that mates with a corresponding feature (not shown) of the front inflator plate 750. When the heads 784 have been pressed into engagement with the front inflator plate 750, the splines and corresponding features provide an interference fit that prevents relative translation or rotation between the fasteners 782 and the front inflator plate 750.

The number of fasteners 782 may be modified to suit various parameters of the design of the airbag module 162. In alternative embodiments, different numbers, of fasteners 782 may be used, including three fasteners 782, six fasteners 782, or eight fasteners 782. In the alternative to the fasteners 782, a variety of different attachment methods may be used, including spot welding, inertial welding, friction stir welding, adhesive attachment, and application of different fasteners.

Each of the rear and front inflator plates 742, 750 is generally rectangular in shape, as viewed along the longitudinal direction 710. As illustrated, the front inflator plate 750 has a first plateau 794 and a second plateau 795, each of which extends longitudinally away from the rear inflator plate 742. The front inflator plate 750 has a rim 796 like the rim 756 of the rear inflator plate 742. The rim 796 also has a flange 758 that extends generally longitudinally to help reduce bending of the front inflator plate 750.

The first plateau 794 has a plurality of orifices 797 that are able to release inflation gas from the inflator 186 into the remainder of the expandable interior volume 185. A screen 798 is positioned between the pouch 749 covering the pyrotechnic 748 and the orifices 797. The screen 798 is optional. In this application, the term "screen" broadly refers to any structure that is able to trap particulate matter from a flow of gas passing through the screen. A screen may include a fabric material, a perforated material, an expandable metal mesh, and/or any other suitable construction.

Additionally, if desired, an expanse of foil or some other frangible structure (not shown) may be positioned between the pouch 749 and the orifices 797 to permit gas flow through the orifices 797 only when the pressure differential across the orifices 797 has reached a threshold level. Such a frangible structure would help the pyrotechnic 748 combust more rapidly by increasing the pressure within the inflator 186 until the threshold pressure is reached to break the frangible structure, thereby permitting inflation gas to exit the inflator 186 via the orifices 797. Such a frangible structure may even seal the inflator 186 from the remainder of the expandable interior volume 185, thereby obviating the pouch 749.

When the initiator 246 receives the electric activation signal, the head 274 of the initiator 246 ignites, thereby rupturing the pouch 749 to break its hermetic seal and igniting the pyrotechnic 748. The pyrotechnic 748 combusts rapidly to produce inflation gas, which passes through the screen 798 and then through the orifices 797, into the remainder of the expandable interior volume 185 to inflate the cushion 179, as illustrated in FIG. 1. Combustion of the pyrotechnic 748 is expedited by high pressure generated between the rear and front inflator plates 742, 750. The orifices 797 may be sized to provide a flow restriction that contributes to pressure buildup within the inflator 186.

During inflation, inflation gas is vented from the expandable interior volume 185 by flowing through a venting orifice 799 of the front inflator plate 750. The inflation gas then flows into the filter 747 and out of the inflator 186 through the venting orifice 753 of the rear inflator plate 742. If desired, the filter 747 may have a cylindrical wall or some other structure that prevents inflation gas from entering the filter 747 directly from within the inflator 186.

Venting is optional, and need not be provided in all embodiments. Thus, the venting orifices 753, 799 need not be provided. The filter 747 is also optional, and may be omitted regardless of whether the venting orifices 753, 799 are present. If the pyrotechnic 748 is selected to burn in a relatively clean manner and/or the screen 798 effectively removes the necessary amount of particulate matter form the inflation gas, venting may be performed without an adjacent filter. The screen 798 is also optional and may not be needed, especially in embodiments in which venting orifices are not provided.

The airbag module 162 may be manufactured in a variety of ways. According to one example, the rear and front cushion panels 180, 132 and the rear and front inflator plates 742, 750 may be formed via stamping or the like. The fasteners 782 may be fabricated according to known methods. The pyrotechnic 748 may be provided in powder form and compacted, with or without binding agents, to form a solid block. Alternatively, the pyrotechnic 748 may remain in powder form. Metal may be rolled and/or stamped into a flat shape to form the pouch 749, which may then be sealed around the pyrotechnic 748 via crimping, staking, mechanical fastening, adhesive bonding, or other known methods.

The initiator retainer 244 may be manufactured through known methods such as casting, molding, or the like, and may be made as one piece or as multiple pieces that are subsequently attached together to form the entire initiator retainer 244. The filter 747 and the screen 798 may each be formed from a metallic mesh via known methods.

In order to assemble the above-described components, the fasteners 782 may be pressed into engagement with the front inflator plate 750 so that the shanks 786 extend through the aligned holes (not shown) formed in the rim 796 of the front inflator plate 750. The front inflator plate 750 is then inserted into engagement with the rear cushion panel 180 such that the shanks 786 pass through the aligned holes (not shown) formed in the rear cushion panel 180. The front cushion panel 132 is then attached to the rear cushion panel 180, for example, via the spot welds 314. Advantageously, welding can be performed prior to installation of the pyrotechnic 748.

The screen 798 is then placed within the first plateau 794 of the front inflator plate 750, against the orifices 797. The pouch 749 containing the pyrotechnic 748 is positioned to abut the screen 798, and the filter 747 is installed in the second plateau 795. The initiator 246 is pressed or otherwise inserted into the initiator retainer 244, and the initiator retainer 244 is pressed or otherwise seated in the opening 752 of the rear inflator plate 742. The rear inflator plate 742 is coupled to the front inflator plate 750 and the rear cushion panel 180 by inserting the shanks 786 through the aligned holes (not shown) formed in the rim 756 of the rear inflator plate 742.

The airbag module 162 is then assembled and ready for installation in the vehicle 110. The shanks 786 may be attached to one or more members under the bottom cushion 164 of the front seat 120 of the vehicle 110. For example, the shanks 786 may be inserted through holes in the member(s) and nuts may be applied to keep the airbag module 162 in place. If desired, nuts may also be threaded into engagement with the shanks 786 prior to installation of the airbag module 162 in the vehicle 110 to keep the shanks 786 in the desired orientations during shipping and installation.

Figure 9:
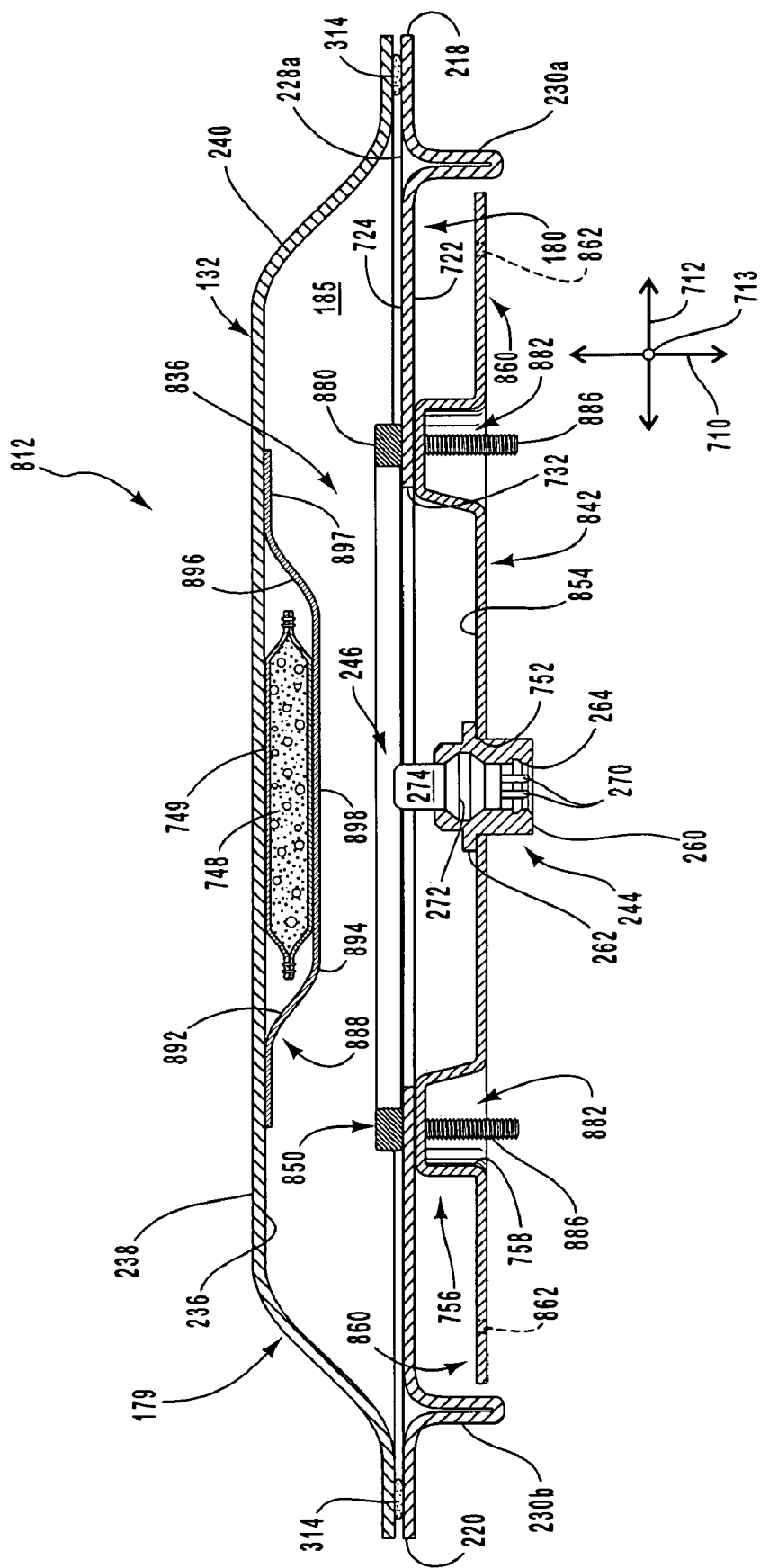
FIG. 9 is a side elevation, section view of a pelvic restraint airbag module according to an alternative embodiment of the invention.

Referring to FIG. 9, a side elevation, section view illustrates an airbag module 812 according to another alternative embodiment of the invention. As shown, the airbag module 812 includes a cushion 179, which may be the same as that of the previous embodiment. The cushion 179 defines an expandable interior volume 185. An inflator 836 is integrated with the cushion 179 and is different from the inflator 186 of the previous embodiment.

More precisely, the inflator 836 includes a rear inflator plate 842 and a front inflator plate 850. The rear inflator plate 842 has a shape somewhat similar to that of the rear inflator plate 742. The rear inflator plate 842 has a rim 756 in which a flange 758 is formed. A plurality of holes (not shown) are formed in the rim 756. The rear inflator plate 842 also has a recess 854 in which an opening 752 is formed to receive an initiator retainer 244. By contrast with the rear inflator plate 742, the opening 752 of the rear inflator plate 842 is positioned generally at the center of the recess 854. The rear inflator plate 842 lacks a venting orifice like the venting orifice 753 of the rear inflator plate 742.

The rear inflator plate 842 also differs from the rear inflator plate 742 of the previous embodiment in that the rear inflator plate 842 is designed to serve as a mounting fixture for attachment of the airbag module 812 to a vehicle. More precisely, the rear inflator plate 842 has a pair of mounting extensions 860 that extend generally along the lateral direction 712, outward with respect to the recess 854. The mounting extensions 860 are integrally formed with and generally perpendicular to the flanges 758.

Each of the mounting extensions 860 has one or more mounting features designed to facilitate attachment of the rear inflator plate 842 to the vehicle. For example, in FIG. 9, each of the mounting extensions 860 has a mounting feature in the form of a hole 862 through which a fastener may pass to fasten the mounting extension 860 to the vehicle. Each mounting extension 860 may have two or more such holes to facilitate secure attachment. In the alternative to the configuration of FIG. 9, mounting extensions of a rear inflator plate may have a variety of different configurations. Mounting features such as tabs, hooks, studs, clips, and the like may be used in place of the holes 862.

The front inflator plate 850 is formed of a plastic, and includes a frame 880 that is generally open in its center. The frame 880 may be generally rectangular in shape, as viewed from along the longitudinal direction 710. The front inflator plate 850 also includes a plurality (for example, four) fasteners 882 that are integrally formed with the frame 880. Each of the fasteners 882 has a shank 886 that is threaded and extends longitudinally through aligned holes in the rear cushion panel 180 and through the aligned holes (not shown) of the rear inflator plate 842. The front inflator plate 850 may be formed via injection molding or the like.

The front inflator plate 850 is optional. In alternative embodiments, a rear inflator plate (not shown) may be attached to the rear cushion panel 180 via some other mechanism, and the rear inflator plate may have integrally formed fasteners or may have separate fasteners, like the fasteners 782, coupled thereto for attachment to the vehicle.

The inflator 836 also has a pyrotechnic 748 sealed within a pouch 749. As in the previous embodiment, the pyrotechnic 748 may be present as a block of solid or pressed material or as a powder. However, the pyrotechnic 748 and the pouch 749 are not positioned between the rear and front inflator plates 742, 750, but are instead attached to the front cushion panel 132 via an expanse of tape 888. The expanse of tape 888 may include a single piece of metal, such as an aluminum foil, with an adhesive side 892 and a non-adhesive side 894. An adhesive 896 is applied to the adhesive side 892. The adhesive 896 may be a relatively strong adhesive designed to attach metal parts together.

The expanse of tape 888 has a peripheral portion 897 attached to the interior surface of the front cushion panel 132 within the recess 240. The expanse of tape 888 also has a central portion 898. The pyrotechnic 748 and the pouch 749 are positioned between the central portion 898 and the interior surface of the front cushion panel 132.

In alternative embodiments, the positions of the initiator 246 and the pyrotechnic 748 may be reversed, with the pyrotechnic 748 adjacent to the rear cushion panel 180 and/or the rear inflator plate 842, and the initiator 246 adjacent to the front cushion panel 132. In yet other alternative embodiments, a pyrotechnic (not shown) may be sealed into a pouch with a central opening or indentation, like the indentation 280 of the pyrotechnic 248 of FIG. 3. The pyrotechnic and the initiator 246 may then be positioned on the same interior surface of the cushion 179 such that the initiator 246 is disposed within the central opening or indentation.

Returning to the configuration of FIG. 9, the initiator retainer 244 retains an initiator 246 in substantially the same manner as in the previous embodiment. The initiator 246 receives an electric activation signal and the head 274 ignites to rupture the central portion 898 of the expanse of tape 888 and the pouch 749 and ignite the pyrotechnic 748. The remaining portions of the expanse of tape 888 may restrict gas flow into the remainder of the expandable interior volume 185 to pressurize the pyrotechnic 748, thereby expediting its combustion.

As the pyrotechnic 748 combusts, inflation gas flows through the rupture in the expanse of tape 888 and into the remainder of the expandable interior volume 185 to inflate the cushion 179. A screen need not be provided because any particulate matter that impacts the rear cushion panel 180, the front cushion panel 132, or the rear inflator plate 842 will be unable to burn through the metal. Since no venting orifice is present, venting of inflation gas from the cushion 179 does not occur.

The airbag module 812 may be manufactured in a variety of ways. According to one method, the front inflator plate 850 is first coupled to the rear cushion panel 180 by inserting the shanks 886 through the aligned holes (not shown) of the rear cushion panel 180. The rear and front cushion panels 180, 132 are then attached together via the spot welds 314.

The pyrotechnic 748 is sealed in the pouch 749 as described in connection with the previous embodiment, and is placed against the adhesive side 892 of the expanse of tape 888, proximate the central portion 898. The expanse of tape 888 is inserted into the cushion 179 through the opening 732 of the rear cushion panel 180 and the adhesive side 892 of the peripheral portion 897 is pressed against the interior of the recess 240 of the front cushion panel 132 so that the expanse of tape 888, the pyrotechnic 748, and the pouch 749 are positioned as shown in FIG. 9.

The initiator 246 is installed in the initiator retainer 244, and the initiator retainer 244 is seated in the opening 752 of the rear inflator plate 842, as described in connection with the previous embodiment. The rear inflator plate 842 is coupled to the rear cushion panel 180 and the front inflator plate 850 by inserting the shanks 886 through the aligned holes (not shown) formed in the rim 756 of the rear inflator plate 842. The airbag module 812 is then fully assembled and ready for installation in a vehicle. The mounting extensions 860 and mounting features 862 may be used to attach the rear inflator plate 842 directly to the vehicle.

Figure 10:
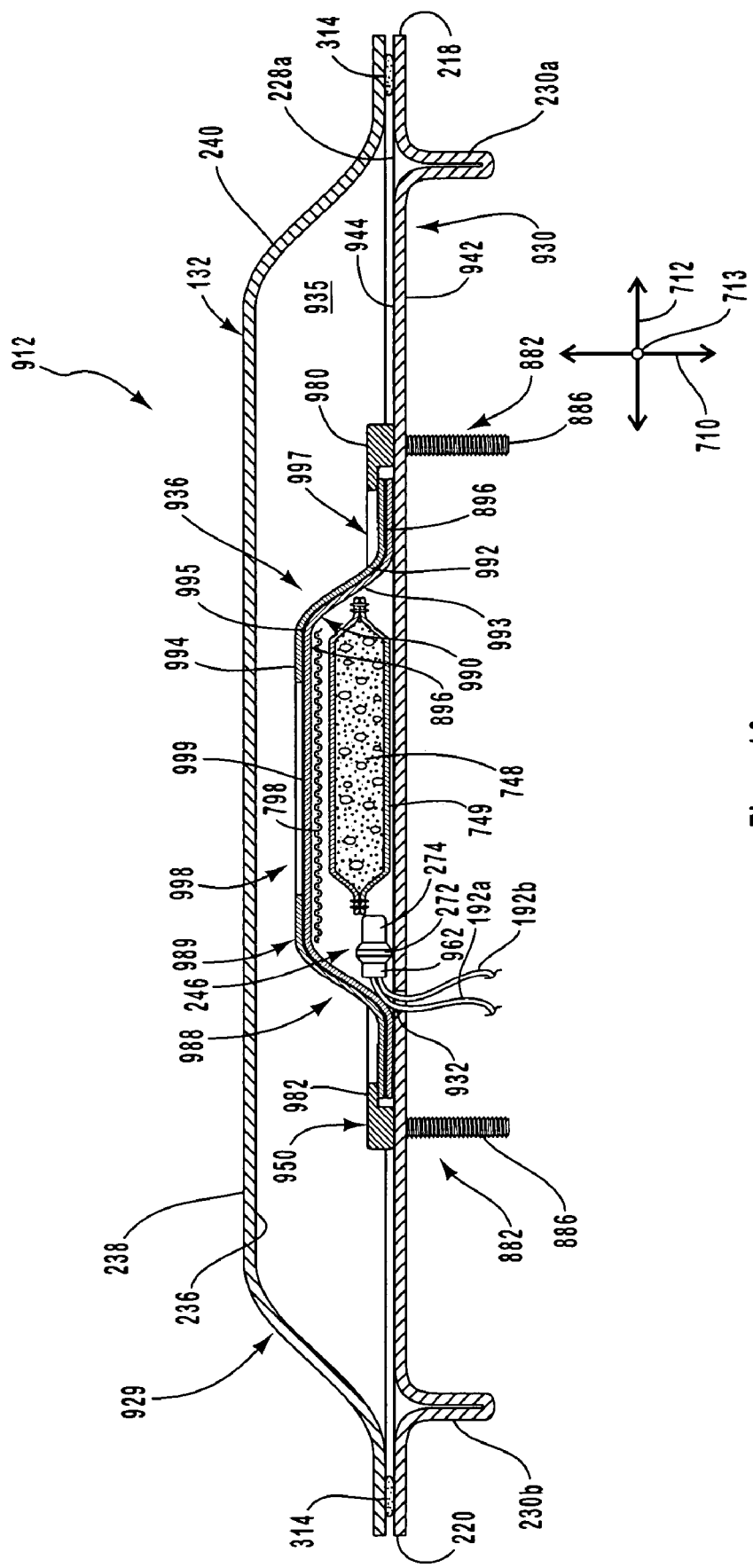
FIG. 10 is a side elevation, section view of a pelvic restraint airbag module according to another alternative embodiment of the invention.

Referring to FIG. 10, a side elevation, section view illustrates an airbag module 912 according to another embodiment of the invention. As shown, the airbag module 912 has a cushion 929 with a front cushion panel 132 like that of the previous embodiments, and a rear cushion panel 930 with a configuration slightly different from that of its predecessors. More precisely, in place of the large opening 732 of the rear cushion panel 180 of the previous embodiments, the rear cushion panel 930 has an opening 932 with a much smaller size. The cushion 929 defines an expandable interior volume 935 within which an inflator 936 is positioned and integrated with the cushion 929.

The rear cushion panel 930 has a rear side 942 facing generally outward, with respect to the cushion 929, and a front side 944 facing into the cushion 929. Aside from replacement of the opening 732 with the smaller opening 932, the rear cushion panel 930 is configured similarly to that of the two previous embodiments. A plurality of holes (not shown) is also present in the rear cushion panel 930 to facilitate attachment of a front inflator plate 950 somewhat similar that of the previous embodiment. The holes are aligned with shanks 886 extending through the rear cushion panel 930 so that the shanks 886 can be inserted through the holes. The rear cushion panel 930 may be stamped from a metal sheet like the rear cushion panel 180 of the two previous embodiments.

The inflator 936 includes an initiator 246 like those of the previous embodiments. However, the initiator 246 is not seated in an initiator retainer or mounted in a rear inflator plate; indeed, no rear inflator plate is present. Rather, the initiator 246 is positioned entirely within the cushion 929, i.e., within the expandable interior volume 935. The initiator 246 is coupled to the lead wires 192a, 192b via a connector 962 that is also disposed entirely within the cushion 929. The connector 962 has electrical contacts (not shown) designed to receive the ignition prongs 270 (not visible in FIG. 10) of the initiator 246.

The front inflator plate 950 is slightly different from the front inflator plate 850 of the previous embodiment. The front inflator plate 950 has a frame 980 that differs from the frame 880 in that the frame 980 has an inwardly extending ledge 982 offset from the front side 944 by a narrow gap. The function of the inwardly extending ledge 982 will be described subsequently.

The inflator 936 also has a pyrotechnic 748 sealed within pouch 749, like those of the two previous embodiments. The pyrotechnic 748, pouch 749, initiator 246, and connector 962 are retained against the front side 944 of the rear cushion panel 930 and within the open portion of the front inflator plate 850 by an expanse of tape 988. The expanse of tape 988 includes a first piece 989 and a second piece 990. Each of the first and second pieces 989, 990 has an adhesive side 992, 993, respectively, and a non-adhesive side 994, 995, respectively. The first and second pieces 989, 990 may be formed of a metal such as an aluminum foil or the like. An adhesive 896 like that of the previous embodiment is applied to the adhesive sides 992, 993.

The expanse of tape 988 has a peripheral portion 997 attached to the rear cushion panel 930 and a central portion 998 that retains the initiator 246, the pyrotechnic 748, and the pouch 749. In alternative embodiments of the invention, a bracket, separate adhesive or other attachment mechanism may be used to more securely attach the initiator 246 within the pocket formed by the expanse of tape 988. In yet other alternatives, the initiator 246 may be retained by a rear inflator plate, like the rear inflator plate 842 of the previous embodiment.

As shown, the second piece 990 is attached directly to the rear cushion panel 930, and the first piece 989 is placed such that the adhesive side 992 of the first piece 989 generally covers the non-adhesive side 995 of the second piece 990. However, the first piece 989 is open at the central portion 998, and the second piece 990 has a burst region 999 positioned at the central portion 998. A screen 798 like that of the embodiment of FIG. 8 is attached to the adhesive side 993 of the second piece 990.

The peripheral portion 997 of the expanse of tape 988 is gripped against the front side 944 of the rear cushion panel 930 by the inwardly extending ledge 982. The peripheral portion 997 may be gripped with a force sufficient that, when the pressure between the expanse of tape 988 and the rear cushion panel 930 rises due to combustion of the pyrotechnic 748, the expanse of tape 988 is able to remain substantially in place. Heavy gauge tape may be used to form the expanse of tape 988 to further retain pressure during combustion.

In alternative embodiments, different configurations (not shown) of the front inflator plate 950, the expanse of tape 988, and the screen 798 may be used. For example, a screen may be sandwiched between two pieces of tape. A screen also may extend out to the peripheral portion of the associated expanse of tape so that the screen can also be gripped by the front inflator plate. If desired, a front inflator plate need not have an inwardly extending ledge, but rather, the associated screen and/or pieces of tape may be made broad enough to be pressed between the entire frame of the front inflator plate and the rear cushion panel 930. If desired, the screen and/or pieces of tape may have holes through which the shanks 886 of the fasteners 882 are able to pass to enable even more secure attachment of the expanse of tape to the rear cushion panel 930. Rather than having an opening in the central portion, one piece of tape may exist only in the central portion to redirect inflation gas flow toward the periphery of the cushion. A variety of additional alternatives would be envisioned by one of skill in the art with the aid of the present disclosure.

After an electric activation signal is transmitted through the lead wires 192a, 192b and through the connector 962 to the initiator 246, the head 274 of the initiator 246 ignites, thereby rupturing the pouch 749 and initiating combustion 748 of the adjacent pyrotechnic 748. The pyrotechnic 748 combusts to produce inflation gas, thereby increasing the pressure within the pocket formed by the expanse of tape 988. The increase in pressure expedites combustion of the pyrotechnic 748.

When the pressure differential between the inflator 936 and the remainder of the expandable interior volume 935 of the cushion 929 reaches a threshold level, the burst region 999 of the second piece 990 ruptures. The inflation gas is then able to flow through the screen 798 and out of the inflator 936 through the ruptured burst region 999 to inflate the cushion 929. The size of the opening of the first piece 989 helps to limit rupture of the second piece 990, thereby determining the size of the opening through which the inflation gas is able to exit the inflator 936. The opening may be sized to provide a flow restriction to maintain pressure within the inflator 936, thereby maintaining a high rate of combustion.

The airbag module 929 may be manufactured in a variety of ways. According to one method, the hole may first be cut in the first piece 989 of the expanse of tape 988. The first and second pieces 989, 990 may then be attached together. The screen 798 may be attached to the adhesive side 993 of the second piece 990.

The pyrotechnic 748 may then be sealed in the pouch 749 as described in connection with previous embodiments. The pyrotechnic 748, pouch 749, connector 962, and initiator 246 may then be placed on the front side 944 of the rear cushion panel 930 such that the lead wires 192a, 192b pass through the opening 932 of the rear cushion panel 930.

The expanse of tape 988 with the attached screen 798 is then attached to the rear cushion panel 930 over the pyrotechnic 748, the pouch 749, the initiator 246, the connector 962, and the adjoining portions of the lead wires 192a, 192b. The peripheral portion 997 is attached securely to the front side 944 of the rear cushion panel 930. The front inflator plate 850 is then coupled to the rear cushion panel 930 by inserting the shanks 886 of the front inflator plate 850 through the holes of the rear cushion panel 930. The front inflator plate 850 is positioned such that the inwardly extending ledge 982 abuts the peripheral portion 997 of the expanse of tape 988. The rear and front cushion panels 930, 132 may then be attached together via the spot welds 314 to complete the assembly.

Figure 11:
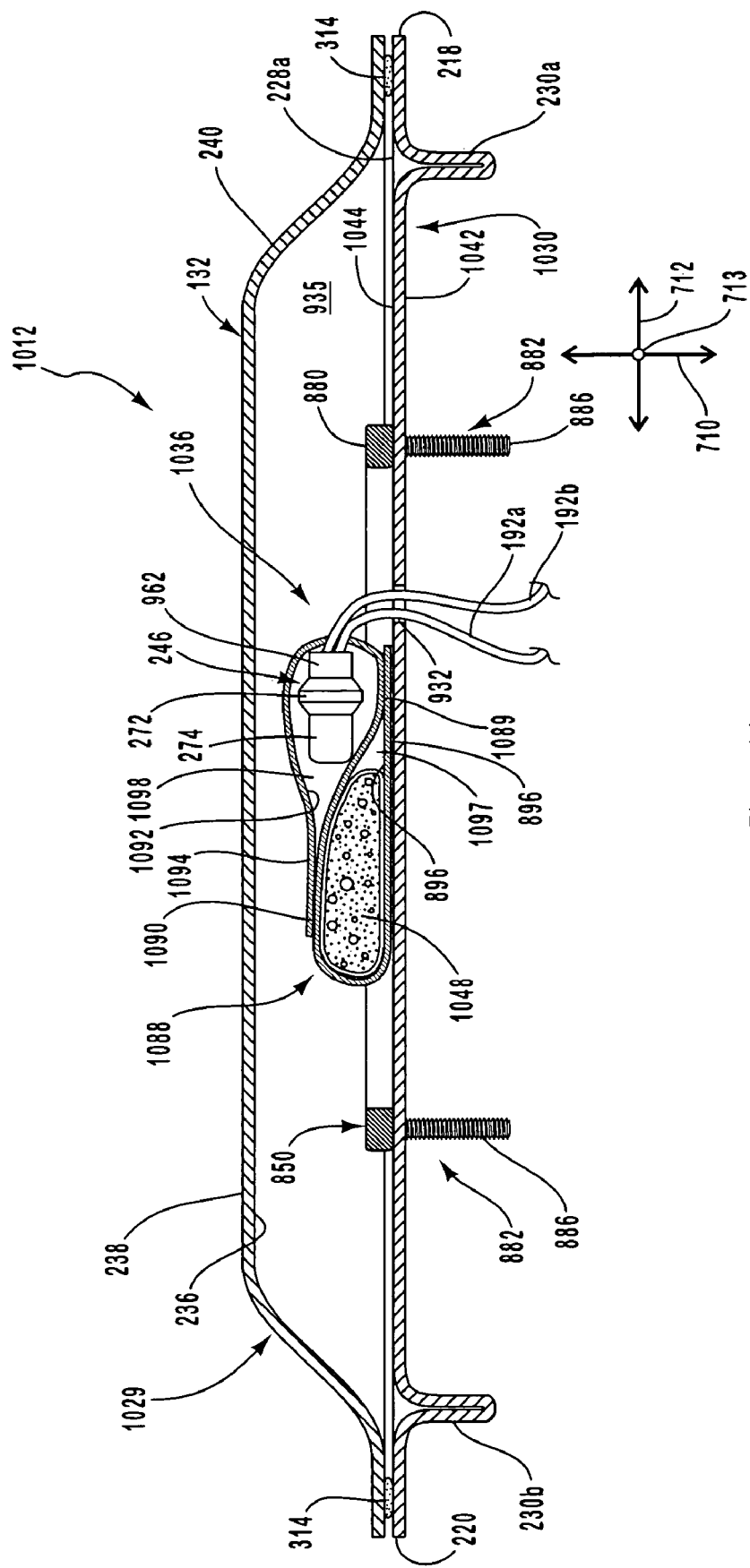
FIG. 11 is a side elevation, section view of a pelvic restraint airbag module according to another alternative embodiment of the invention.

Referring to FIG. 11, a side elevation, section view illustrates an airbag module 1012 according to another alternative embodiment of the invention. The airbag module 1012 includes a cushion 1029 with a rear cushion panel 1030 and a front cushion panel 132 like that of the previous embodiment. The rear cushion panel 1030 is like the rear cushion panel 930 of the previous embodiment, except that the rear cushion panel 1030 has an opening 932 that may be positioned differently from the opening 932 of the rear cushion panel 930. The rear cushion panel 1030 may also be stamped from sheet metal.

The rear and front cushion panels 1030, 132 cooperate to define an expandable interior volume 935 as in the previous embodiment. An inflator 1036 is contained within the expandable interior volume 935 and is integrated with the cushion 1029. As shown, the rear cushion panel 1030 has a rear side 1042 facing generally away from the cushion 1029 and a front side 1044 facing into the cushion 1029.

The inflator 1036 includes a pyrotechnic 1048, which need not have the same configuration as the pyrotechnic 748 of the previous embodiments. The pyrotechnic 1048 may be formed of pressed or loose powder, and need not be sealed within a pouch. Rather, the pyrotechnic 1048 is sealed by an expanse of tape 1088. The expanse of tape 1088 is double-sided, and is folded back on itself in a generally S-shaped configuration. The expanse of tape 1088 is attached to itself at a first interface 1089 and at a second interface 1090.

Since the expanse of tape 1048 is double-sided tape, the expanse of tape 1048 has a first adhesive side 1092 and a second adhesive side 1094. Each of the adhesive sides 1092, 1094 may have an adhesive 896 like those of the preceding embodiments. The S-shaped configuration of the expanse of tape 1048 creates a first compartment 1097 within which the pyrotechnic 1048 is positioned and a second compartment 1098 that holds an initiator 246, connector 962, and adjoining portions of the lead wires 192a, 192b.

The first compartment 1097 forms a hermetic seal around the pyrotechnic 1048. Accordingly, the expanse of tape 1088 serves as a sealing member for the pyrotechnic 1048. The second compartment 1098 need not be sealed, and may advantageously remain unsealed to facilitate passage of the lead wires 192a, 192b from the second compartment 1098 to the remainder of the expandable interior volume 935. The lead wires 192a, 192b pass from the expandable interior volume 935 via the opening 932 of the rear cushion panel 1030.

When the electric activation signal is received by the initiator 246, the head 274 ignites to rupture the portion of the expanse of tape 1088 between the first and second compartments 1097, 1098 and ignite the pyrotechnic 1048. The pyrotechnic 1048 combusts to produce inflation gas. Ignition of the initiator 246 may also rupture the expanse of tape 1088 in a manner that permits immediate escape of inflation gas into the remainder of the expandable interior volume 935 to inflate the cushion 1029. The pyrotechnic 1048 may be of a type that burns rapidly, even in the absence of high pressure. Alternatively, the expanse of tape 1088 may remain intact, at least to an extent sufficient to help build some pressure to expedite combustion of the pyrotechnic 1048.

The airbag module 1012 may be manufactured according to a number of methods. In one example, the front inflator plate 850 may first be coupled to the rear cushion panel 1030 by inserting the shanks 886 through the aligned holes (not shown) of the rear cushion panel 1030.

A portion of the expanse of tape 1088 may be wrapped around the pyrotechnic 1048 in a humidity-controlled or evacuated environment to provide the first interface 1089, thereby forming a hermetic seal containing the pyrotechnic. Assembly of the pyrotechnic 1048 and the expanse of tape 1088 in an evacuated or low-pressure environment may cause positive pressure from outside the first compartment 1097 to help maintain the seal.

The remaining length of the expanse of tape 1088 may then be wrapped around the initiator 246, the connector 962, and the adjoining portions of the lead wires 192a, 192b to form the second interface 1090, thereby defining the second compartment 1098. The lead wires 192a, 192b may pass through the second interface 1090, or through an opening formed in the expanse of tape 1088, as illustrated in FIG. 11. The lead wires 192*a*, 192*b* are also inserted through the opening 932 of the rear cushion panel 1030.

The expanse of tape 1088 containing the pyrotechnic 1048, the initiator 246, the connector 962, and the adjoining portions of the lead wires 192*a*, 192*b* is then attached to the front side 1044 of the rear cushion panel 1030, within the open portion of the front inflator plate 850. The rear and front inflator plates 1030, 132 are then attached together via the spot welds 314 to complete the assembly.

Figure 12:
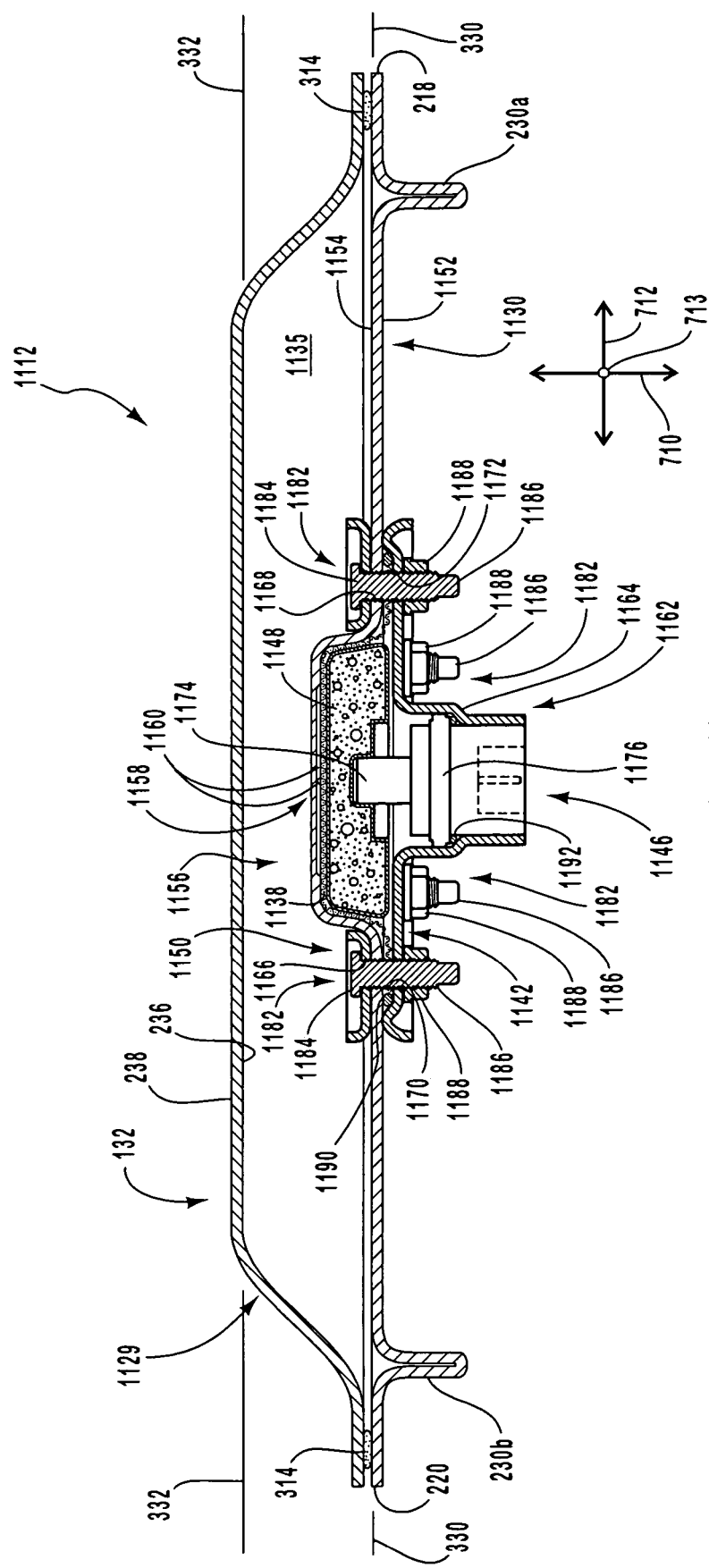
FIG. 12 is a side elevation, section view of a pelvic restraint airbag module according to yet another alternative embodiment of the invention.

Referring to FIG. 12, a side elevation, section view illustrates an airbag module 1112 according to yet another embodiment of the invention. As shown, the airbag module 112 includes a cushion 1129, which is generally formed by a rear cushion panel 1130 and a front cushion panel 132 like that of the previous embodiment. The rear and front cushion panels 1130, 132 cooperate to define an expandable interior volume 1135. An inflator 1136 is disposed outside, but adjacent to, the expandable interior volume 1135. The inflator 1136 generally includes a screen 1138, a rear inflator plate 1142, an initiator 1146, a pyrotechnic 1148, and a front inflator plate 1150.

The rear cushion panel 1130 has a rear side 1152 and a front side 1154. Additionally, the rear cushion panel 1130 has a depression 1156 that is generally tubular in shape, and extends toward the front cushion panel 132.

As in all previous embodiments, the front cushion panel 132 defines a front plane 332 and the rear cushion panel 1130 defines a rear plane 330. The front plane 332 is as shown in FIG. 4 because the front cushion panel 132 is the same as that shown in FIG. 4. The rear plane 330 is coplanar with the portion of the front side 1154 of the rear cushion panel 1130 that lies outside the depression 1156, because that is the location of the largest inwardly oriented planar surface of the rear cushion panel 1130. A portion of the pyrotechnic 1148 lies between the rear and front planes 330, 332, although the pyrotechnic 1148 is disposed outside the expandable interior volume 1135 of the cushion 1129.

A frangible portion 1158 is positioned at the interior end of the depression 1156 of the rear cushion panel 1130. Generally, a "frangible portion" is a portion of a wall that is deliberately weakened in some manner to permit controlled rupture of the wall. A frangible portion may include a region of reduced wall thickness, a region in which a crystalline material structure has been disturbed, a pre-stressed region, a region in which a different material composition is present, or any other structure that provides a controlled, breakable surface.

In the embodiment of FIG. 12, the frangible portion 1158 includes two scores 1160 that intersect each other to form an X-shape. Each of the scores 1160 may have a generally V-shaped cross section to provide a relatively sharp point for tear propagation. Each of the scores 1160 may extend to a depth of about half the total thickness of the rear cushion panel 1130. For example, if the rear cushion panel 1130 is generally 0.014 inches thick, the scores 1160 may each be about 0.007 inches in depth. Sufficient thickness remains to keep the frangible portion 1158 sealed to prevent gas flow between the inflator 1136 and the cushion 1129 until the frangible portion 1158 is ruptured by deployment of the inflator 1136.

The rear inflator plate 1142 has an initiator retention tube 1162 designed to retain the initiator 1146, which is not shown in section for simplicity. The initiator retention tube 1162 has a stepped down section 1164 at which the diameter of the initiator retention tube 1162 changes to keep the initiator 1146 seated in the initiator retention tube 1162.

The initiator 1146 may have an integrated retention structure that performs a function somewhat similar to that of the initiator retainer 244 of some of the previous embodiments. Accordingly, the initiator 1146 is shaped differently from the initiator 246 illustrated previously. The initiator 1146 may have a head 1174 that combusts in response to receipt of an activation signal. The head 1174 is positioned in a recess of the pyrotechnic 1148, which may be pressed into a brick or allowed to remain in loose form, as a powder. A pouch or other structure (not shown) may optionally be used to seal the pyrotechnic 1148 from moisture. However, the inflator 1136 may beneficially be sealed to prevent moisture entry, thereby making such a sealing member unnecessary.

An enlarged portion 1176 of the initiator 1146 fits within the larger diameter portion of the initiator retention tube 1162, but is too large to pass through the smaller diameter portion. The enlarged portion 1176 is thus seated against the stepped down section 1164 of the initiator retention tube 1162. The initiator 1146 may have a receptacle (not shown) designed to receive a connector similar to the connector 962 of FIGS. 10 and 11.

The screen 1138 may be constructed of a variety of materials, including perforated metal, a metallic mesh, and the like. The screen 1138 may be formed in the shape illustrated in FIG. 12, with a generally rigid structure. The screen 1138 is designed to capture particulate matter, while permitting inflation gas to pass through.

The inflator 1136 is held together and held against the rear cushion panel 1130 through the use of holes 1166, 1168, 1170, 1172 formed in the front inflator plate 1150, the rear cushion panel 1130, the screen 1138, and the rear inflator plate 1142, respectively. More precisely, fasteners 1182 somewhat similar to the fasteners 782 of FIG. 8, may be inserted through the holes 1166, 1168, 1170, 1172. Each of the fasteners 782 includes a head 1184 and a shank 1186 sized to fit through the holes 1166, 1168, 1170, 1172.

Like the fasteners 782, the fasteners 1182 may be PIM fasteners. Thus, the heads 1184 may be pressed into engagement with the front inflator plate 1150 in a manner that generally keeps the fasteners 1182 from moving. The shanks 1186 may be threaded, and a nut 1188 may be threaded into engagement with each of the shanks 1186 so that the front inflator plate 1150, the rear cushion panel 1130, the screen 1138, and the rear inflator plate 1142 are all held securely together. In the configuration of FIG. 12, six fasteners 1182 are present. However, any number of fasteners 1182 may be used.

In addition to the components described above, the inflator 1136 has a first o-ring 1190 positioned between the rear cushion panel 1130 and the rear inflator plate 1142. The first o-ring 1190 encircles the screen 1138 and the shanks 1186 of the fasteners 1182. The periphery of the rear inflator plate 1142 may extend toward the rear cushion panel 1130 to keep the first o-ring 1190 in place. The first o-ring 1190 prevents gas (and moisture) from entering the inflator 1136 through the space between the rear cushion panel 1130 and the rear inflator plate 1142.

Additionally, the inflator 1136 has a second o-ring 1192 positioned between the initiator 1146 and the initiator retention tube 1162, adjacent to the enlarged portion 1176 of the initiator 1146. The second o-ring 1192 is effectively sandwiched between the enlarged portion 1176 and the stepped down section 1164. Thus, the second o-ring prevents gas (and moisture) from entering the inflator 1136 through the space between the initiator 1146 and the initiator retention tube 1162.

When the initiator 1146 receives an activation signal, the head 1174 of the initiator ignites and causes the pyrotechnic 1148 to ignite as well. The pyrotechnic produces pressurized inflation gas, which impinges against the frangible portion 1158 and causes the frangible portion 1158 to tear open at the scores 1160. The inflation gas then flows into the expandable interior volume 1135 to inflate the cushion 1129. In the embodiment of FIG. 12, venting is not provided, but may be provided if desired, with or without filtering of the vented inflation gas.

The airbag module 1112 may be manufactured according to a number of methods. The front and rear cushion panels 132, 1130 may be stamped. The scores 1160 of the frangible portion 1158 may be made simultaneously with the stamping process through the use of a stamping die that has ridges shaped to form the scores 1160. The front and rear inflator plates 1150, 1142 may also be stamped. The screen 1138 may be stamped from a perforated expanse of metal, or may be molded or otherwise shaped. The initiator 1146, the fasteners 1182, and the nuts 1188 may be fabricated through the use of known methods.

The initiator 1146 and the second o-ring 1192 may first be seated in the initiator retention tube 1162 of the rear inflator plate 1142. The pyrotechnic 1148 and the screen 1138 may then be assembled with the rear inflator plate 1142 and pyrotechnic 1148. The pyrotechnic 1148 and the screen 1138 are placed against the rear cushion panel 1130 such that portions of the pyrotechnic 1148 and the screen 1138 are inserted into the depression 1156 of the rear cushion panel 1130, as shown in FIG. 12. The screen 1138 may then be directly adjacent to the frangible portion 1158.

The front inflator plate 1150 is then installed around the depression 1156. The shanks 1186 of the fasteners 1182 are inserted through the holes 1166, 1168, 1170, 1172 and the heads 1184 of the fasteners 1182 pressed against the front inflator plate 1150. Alternatively, the heads 1184 may be pressed against the front inflator plate 1150 prior to assembly of the front inflator plate 1150 with the rear cushion panel 1130 to fix the fasteners 1182 in place with respect to the front inflator plate 1150.

The nuts 1188 are rotated into engagement with the shanks 186 and tightened against the rear inflator plate 1142. The nuts 1188 may be tightened sufficiently to prevent gas entry into the inflator 1136 through the holes 1172 of the rear inflator plate 1142. The front and rear cushion panels 132, 1130 are then attached together as indicated in connection with previous embodiments to complete assembly of the airbag module 1112. The airbag module 1112 may then be installed in a vehicle.

The airbag modules and associated methods of the present invention present significant improvements in airbag design. Through the use of inflators integrated with comparatively rigid cushion materials, manufacturing and installation costs may be reduced considerably. Several parts may be eliminated in favor of simple forms of attachment such as spot welds. Cushions need not be sealed due to the internal sealing of pyrotechnic materials. Additionally, separate production lines or facilities need not be provided for manufacture of the inflator and cushion. Hence, airbag protection may be made available to a larger number of people at reduced cost.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag module for protecting an occupant of a vehicle from impact, the airbag module comprising:
   a cushion comprising a front cushion panel and a rear cushion panel, each of which is constructed of a substantially rigid material, the cushion defining an expandable interior volume, wherein the front cushion panel defines a front plane and the rear cushion panel defines a rear plane; and
   a pyrotechnic, at least a portion of which is disposed between the front and rear planes, wherein the pyrotechnic is combustible to produce a quantity of inflation gas sufficient to inflate the cushion to protect the occupant from impact, wherein the pyrotechnic is hermetically sealed to restrict moisture entry into the pyrotechnic from within the expandable interior volume, further comprising an initiator, wherein the initiator and the pyrotechnic are components of an inflator attached to an interior surface of the cushion by an attachment mechanism disposed entirely within the expandable interior volume.

2. The airbag module of claim 1, wherein the cushion is positioned to inflate proximate knees of the occupant to restrict forward motion of the knees during frontal impact.

3. The airbag module of claim 1, wherein the cushion is positioned to inflate underneath legs of the occupant to restrict forward motion of a pelvis of the occupant during frontal impact.

4. The airbag module of claim 1, wherein the cushion is positioned alongside a pelvis of the occupant to restrict lateral motion of the pelvis.

5. The airbag module of claim 1, wherein the cushion is constructed of a material selected from the group consisting of steel, aluminum, and plastic.

6. The airbag module of claim 5, wherein the cushion is constructed substantially of steel.

7. The airbag module of claim 6, wherein the steel of the cushion has a thickness ranging from about 0.010 inches to about 0.020 inches.

8. The airbag module of claim 1, wherein the initiator is disposed proximate the pyrotechnic to initiate combustion of the pyrotechnic in response to receipt of an electric activation signal by the initiator.

9. The airbag module of claim 8, wherein the initiator is disposed entirely within the expandable interior volume, wherein the cushion comprises an opening through which at least one wire passes to convey the electric activation signal to the initiator.

10. The airbag module of claim 1, wherein the pyrotechnic is positioned outside the expandable interior volume, wherein the cushion comprises a frangible portion that forms the hermetic seal between the pyrotechnic and the expandable interior volume, wherein the frangible portion is positioned such that inflation gas formed by combustion of the pyrotechnic ruptures the frangible portion to enter the expandable interior volume through the frangible portion.

11. The airbag module of claim 1, wherein the pyrotechnic is positioned within the expandable interior volume, wherein the airbag module further comprises a sealing member positioned within the expandable interior volume to form the hermetic seal between the pyrotechnic and a remainder of the expandable interior volume.

12. The airbag module of claim 11, wherein the sealing member comprises a metal foil, the airbag module further comprising a front inflator plate attached to an inward facing surface of the rear cushion panel to enclose the pyrotechnic between the front inflator plate and the rear cushion panel, the front inflator plate comprising a plurality of orifices, wherein the metal foil is positioned to block the orifices to substantially prevent gas flow through the front inflator plate.

13. The airbag module of claim 11, wherein the sealing member comprises a metal foil shaped to form a pouch that fully encloses the pyrotechnic.

14. The airbag module of claim 11, wherein the sealing member comprises an expanse of tape disposed within the expandable interior volume, the expanse of tape having an adhesive side secured to the cushion such that the pyrotechnic is disposed between the adhesive side and an interior surface of the cushion.

15. The airbag module of claim 14, further comprising a front inflator plate attached to an inward facing surface of the rear cushion panel such that the front inflator plate holds a portion of the expanse of tape against the rear cushion panel to secure the portion of the expanse of tape during combustion of the pyrotechnic.

16. The airbag module of claim 1, further comprising a filter positioned adjacent to a venting orifice such that inflation gas is able to exit the cushion by flowing through the filter and the venting orifice.

17. An airbag module fur protecting an occupant of a vehicle from impact, the airbag module comprising:
a front cushion panel;
a rear cushion panel coupled to the front cushion panel to enclose an expandable interior volume;
a pyrotechnic configured to pressurize the interior volume upon receipt of an activation signal; and
a front inflator plate attached to an inward facing surface of the rear cushion panel to enclose the pyrotechnic between the front inflator plate and the rear cushion panel, wherein the front inflator plate is constructed of a substantially rigid material.

18. The airbag module of claim 17, wherein the front inflator plate and the front and rear cushion panels are constructed substantially of steel.

19. The airbag module of claim 17, further comprising an initiator positioned proximate the pyrotechnic, the rear cushion panel having an opening through which the activation signal is conveyed to the initiator to initiate combustion of the pyrotechnic.

20. The airbag module of claim 17, wherein the front inflator plate is attached to the rear cushion panel through the use of an attachment mechanism that operates independently of any rigid mechanical fasteners.

21. The airbag module of claim 20, wherein the attachment mechanism comprises a plurality of spot welds distributed about a perimeter of the front inflator plate and disposed between the front inflator plate and the rear cushion panel to attach the front inflator plate to the rear cushion panel.

22. The airbag module of claim 17, further comprising a rear inflator plate attached to the front inflator plate, wherein the rear inflator plate is disposed within the expandable interior portion, wherein the rear inflator plate is attached directly to the rear cushion panel and the front inflator plate is attached to the rear cushion panel via attachment to the rear inflator plate.

23. The airbag module of claim 17, further composing a rear inflator plate attached to the front inflator plate, wherein the rear inflator plate is disposed outside the expandable interior portion, wherein the front inflator plate is attached to the rear inflator plate such that a portion of the rear cushion panel is disposed between the front and rear inflator plates.

24. The airbag module of claim 23, wherein the front inflator plate is attached to the rear inflator plate through the use of a plurality of fasteners that extend through at least one opening in the rear cushion panel and through at least one opening in the rear inflator plate.

25. An airbag module comprising:
a cushion having an expandable interior volume bounded by an interior surface, wherein the cushion is constructed of a substantially rigid material;
an inflator disposed at least partially within the expandable interior volume to pressurize the expandable interior volume upon receipt of an activation signal; and
an attachment mechanism disposed entirely within the expandable interior volume to attach the inflator to the interior surface, wherein the pyrotechnic is positioned within the expandable interior volume, wherein the airbag module further comprises a sealing member positioned within the expandable interior volume to form the hermetic seal between the pyrotechnic and a remainder of the expandable interior volume.

26. The airbag module of claim 25, wherein the cushion comprises a plurality of folds arranged to permit expansion of the cushion along at least two perpendicular directions.

27. The airbag module of claim 25, wherein the inflator comprises:
a front inflator plate attached directly to the interior surface to define an interior inflator volume; and
a pyrotechnic disposed within the interior inflator volume to produce inflation gas.

28. The airbag module of claim 25, wherein the inflator comprises:
a front inflator plate;
a rear inflator plate attached to the front inflator plate to define an interior inflator volume, wherein the rear inflator plate is attached directly to the interior surface; and
a pyrotechnic disposed within the interior inflator volume to produce inflation gas.

29. The airbag module of claim 25, wherein the attachment mechanism operates independently of any rigid mechanical fasteners.

30. The airbag module of claim 29, wherein the attachment mechanism comprises one or more items selected from the group consisting of line welds, spot welds, radio frequency welds, ultrasonic welds, frictional welds, laser welds, inertial welds, brazed interfaces, adhesives, and chemical bonds.

31. The airbag module of claim 30, wherein the attachment mechanism comprises a plurality of spot welds distributed about a perimeter of the inflator and disposed between the inflator and the interior surface to attach the inflator to the interior surface.

32. A method for protecting an occupant of a vehicle from impact through the use of an airbag module comprising a cushion comprising a front cushion panel defining a front plane and a rear cushion panel defining a rear plane, wherein the front and rear cushion panels cooperate to define an expandable interior volume, and a pyrotechnic, hermetically sealed to restrict moisture entry into the pyrotechnic from within the expandable interior volume, the method comprising:
initiating combustion of the pyrotechnic, wherein at least a portion of the pyrotechnic is disposed between the front and rear planes;
breaking the hermetic seal in response to the combustion, thereby enabling inflation gas from the pyrotechnic to inflate the cushion; and
producing a sufficient quantity of inflation gas via combustion of the pyrotechnic to inflate the cushion to protect the occupant from impact, wherein the cushion is constructed of a substantially rigid material.

33. The method of claim 32, wherein inflating the cushion comprises positioning the cushion to restrict forward motion of knees of the occupant during frontal impact.

34. The method of claim 32, wherein the cushion is positioned underneath legs of the occupant, wherein inflating the cushion comprises restricting forward motion of a pelvis of the occupant during frontal impact.

35. The method of claim 32, wherein the cushion is positioned alongside a pelvis of the occupant, wherein inflating the cushion comprises restricting lateral motion of the pelvis.

36. The method of claim 32, wherein the airbag module further comprises an initiator disposed proximate the pyrotechnic, wherein initiating combustion of the pyrotechnic comprises initiating combustion of the initiator in response to receipt of an electric activation signal by the initiator.

37. The method of claim 32, wherein the pyrotechnic is positioned outside the expandable interior volume, wherein the cushion comprises a frangible portion that forms the hermetic seal between the pyrotechnic and the expandable interior volume, wherein breaking the hermetic seal comprises rupturing the frangible portion.

38. The method of claim 32, wherein a sealing member comprises a metal foil, the airbag module further comprising a front inflator plate attached to an inward facing surface of the rear cushion panel to enclose the pyrotechnic between the front inflator plate and the rear cushion panel, the front inflator plate comprising a plurality of orifices, wherein the metal foil is positioned to block the orifices to substantially prevent gas flow through the front inflator plate, wherein moving at least a portion of the sealing member comprises rupturing the metal foil to unblock the orifices.

39. The method of claim 32, wherein a sealing member comprises a metal foil shaped to form a pouch that fully encloses the pyrotechnic, wherein moving at least a portion of the sealing member comprises rupturing the pouch.

40. The method of claim 32, wherein the airbag module further comprises a filter positioned adjacent to a venting orifice, the method further comprising permitting inflation gas to exit the cushion by flowing through the filter and the venting orifice.

41. A method for manufacturing an airbag module, the method comprising:
forming a front cushion panel and a rear cushion panel;
forming a front inflator plate of a substantially rigid material;
coupling the front inflator plate to an inward facing surface of the rear cushion panel to define an interior inflator volume; and
coupling the front cushion panel to the rear cushion panel to define an expandable interior volume that contains the front inflator plate, further comprising an inflator and an initiator, wherein the initiator and a pyrotechnic are components of an inflator attached to an interior surface of the cushion by an attachment mechanism disposed entirely within the expandable interior volume.

42. The method of claim 41, further comprising:
forming a rear inflator plate; and
attaching the rear inflator plate directly to the rear cushion panel;
wherein coupling the front inflator plate to the rear cushion panel comprises attaching the front inflator plate directly to the rear inflator plate such that the front inflator plate is attached to the rear cushion panel via attachment to the rear inflator plate.

43. The method of claim 41, further comprising:
forming a rear inflator plate;
disposing the rear inflator plate outside the expandable interior portion; and
attaching the rear inflator plate to the front inflator plate such that a portion of the rear cushion panel is disposed between the front and rear inflator plates.

44. The method of claim 43, wherein attaching the rear inflator plate to the front inflator plate comprises extending a plurality of fasteners through at least one opening in the rear cushion panel and through at least one opening in the rear inflator plate.

45. The method of claim 41, further comprising:
forming an opening in the rear cushion panel; and
installing the initiator retainer in the opening.

46. The method of claim 45, further comprising positioning the pyrotechnic proximate the initiator, wherein coupling the front inflator plate to the rear cushion panel comprises enclosing the pyrotechnic between the front inflator plate and the rear cushion panel.

47. The method of claim 41, wherein forming the front cushion panel, the rear cushion panel, and the front inflator plate each comprise stamping a metal sheet into a desired shape.

48. The method of claim 41, wherein coupling the front inflator plate to the rear cushion panel comprises applying an attachment mechanism that operates independently of any rigid mechanical fasteners.

49. The method of claim 48, wherein coupling the front inflator plate to the rear cushion panel comprises applying a plurality of spot welds about a perimeter of the front inflator plate, between the front inflator plate and the rear cushion panel to attach the front inflator plate to the rear cushion panel.

* * * * *

UNITED STATES PATENT AND TRADEMARK OFFICE
CERTIFICATE OF CORRECTION

PATENT NO. : 7,396,040 B2　　　　　　　　　　　　　　　　　　　　　　　　Page 1 of 1
APPLICATION NO. : 11/087017
DATED : July 8, 2008
INVENTOR(S) : Mark L. Enders et al.

It is certified that error appears in the above-identified patent and that said Letters Patent is hereby corrected as shown below:

In column 31, line 26, please replace "airbag module fur protecting" with --airbag module for protecting--

In column 31, line 62, please replace "further composing a" with --further comprising a--

Signed and Sealed this

Nineteenth Day of August, 2008

JON W. DUDAS
*Director of the United States Patent and Trademark Office*